US009091037B2

(12) United States Patent  
Fairbairn

(10) Patent No.: US 9,091,037 B2  
(45) Date of Patent: Jul. 28, 2015

(54) ADJUSTABLE MONOPOLE SUPPORT STRUCTURE

(71) Applicant: Trinity Meyer Utility Structures, LLC, Dallas, TX (US)

(72) Inventor: Mark H. Fairbairn, Red Wing, MN (US)

(73) Assignee: Trinity Meyer Utility Structures, LLC, Dallas, TX (US)

( * ) Notice: Subject to any disclaimer, the term of this patent is extended or adjusted under 35 U.S.C. 154(b) by 0 days.

(21) Appl. No.: 14/056,639

(22) Filed: Oct. 17, 2013

(65) Prior Publication Data

US 2014/0115978 A1     May 1, 2014

Related U.S. Application Data

(60) Provisional application No. 61/721,167, filed on Nov. 1, 2012.

(51) Int. Cl.
| | |
|---|---|
| *E02D 27/42* | (2006.01) |
| *E04H 12/22* | (2006.01) |
| *F03D 11/04* | (2006.01) |
| *H01Q 1/12* | (2006.01) |
| *E04H 12/08* | (2006.01) |

(52) U.S. Cl.  
CPC ............ *E02D 27/42* (2013.01); *E04H 12/2253* (2013.01); *H01Q 1/12* (2013.01); *H01Q 1/1242* (2013.01); *E02D 27/425* (2013.01); *E04H 12/08* (2013.01); *F03D 11/045* (2013.01)

(58) Field of Classification Search  
CPC ........... E02D 5/80; E02D 5/801; E02D 5/223; E02D 5/54; E02D 5/56; E02D 27/42; E02D 27/16; E02D 27/425; E04H 12/2253; E04H 12/24; F03D 11/04; F03D 11/045  
USPC ........... 52/169.9, 169.13, 170, 155, 157, 156, 52/298, 705, 40; 405/231, 244  
See application file for complete search history.

(56) References Cited

U.S. PATENT DOCUMENTS

| | | | | |
|---|---|---|---|---|
| 1,689,050 | A | * | 10/1928 | Rawley ............................ 52/152 |
| 4,068,445 | A | * | 1/1978 | Bobbitt ....................... 52/741.11 |
| 4,339,899 | A | * | 7/1982 | Klenk et al. ..................... 52/157 |
| 6,038,823 | A | | 3/2000 | Gallimore et al. |
| 6,655,875 | B1 | | 12/2003 | Pignato |

(Continued)

FOREIGN PATENT DOCUMENTS

WO       WO 0046452 A1 *  8/2000

OTHER PUBLICATIONS

Canadian Office Action issued in CA Patent Appl. No. 2,831,782; 4 pages, Feb. 19, 2015.

*Primary Examiner* — Ryan Kwiecinski  
(74) *Attorney, Agent, or Firm* — Baker Botts L.L.P.

(57) ABSTRACT

A support assembly includes a plurality of support arms coupled to a pole or tower structure. The plurality of support arms project radially from the pole or tower structure in a spaced relationship. A plurality of adjustable foot assemblies are coupled to respective distal ends of the plurality of support arms. Each of the plurality of adjustable foot assemblies is configured for coupling to an embedded helical pier. Each of the plurality of adjustable foot assemblies is capable of movement in each of three dimensions relative to the respective support arm to which it is coupled during installation of the support assembly.

6 Claims, 19 Drawing Sheets

(56) References Cited

U.S. PATENT DOCUMENTS

| | | |
|---|---|---|
| 7,004,683 B1 * | 2/2006 | Rupiper .................. 405/229 |
| 7,044,686 B2 * | 5/2006 | May .................. 405/230 |
| 7,059,095 B1 | 6/2006 | Stevens et al. |
| 7,195,426 B2 | 3/2007 | May |
| 7,665,931 B2 | 2/2010 | Deringer |
| 7,677,840 B2 | 3/2010 | Rabichev et al. |
| 8,109,057 B2 * | 2/2012 | Stark .................. 52/297 |
| 8,505,867 B2 * | 8/2013 | Conrad .................. 248/431 |
| 2002/0062617 A1 * | 5/2002 | diGirolamo et al. ............ 52/688 |
| 2009/0090836 A1 | 4/2009 | Harris |
| 2013/0227897 A1 * | 9/2013 | Palmer et al. .................. 52/157 |
| 2013/0227898 A1 * | 9/2013 | Fairbairn et al. ............. 52/169.9 |

* cited by examiner

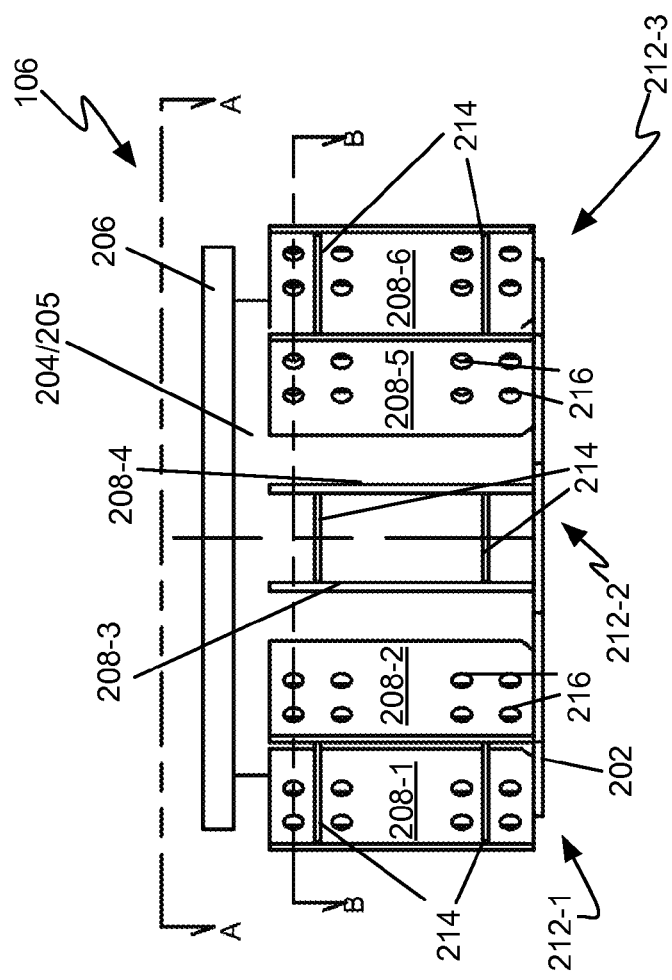
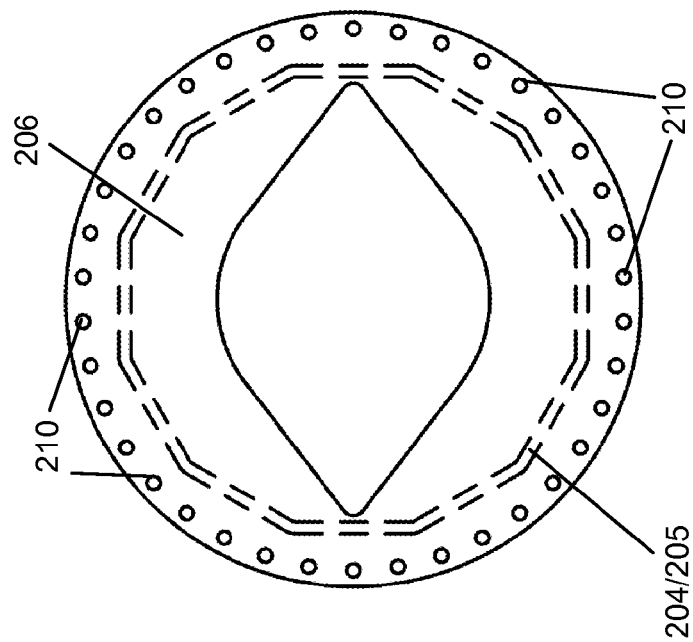
FIG. 2B
FIG. 2C

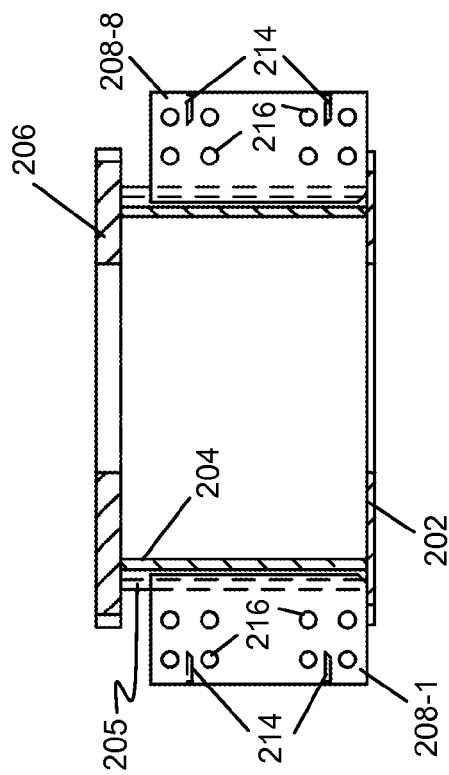
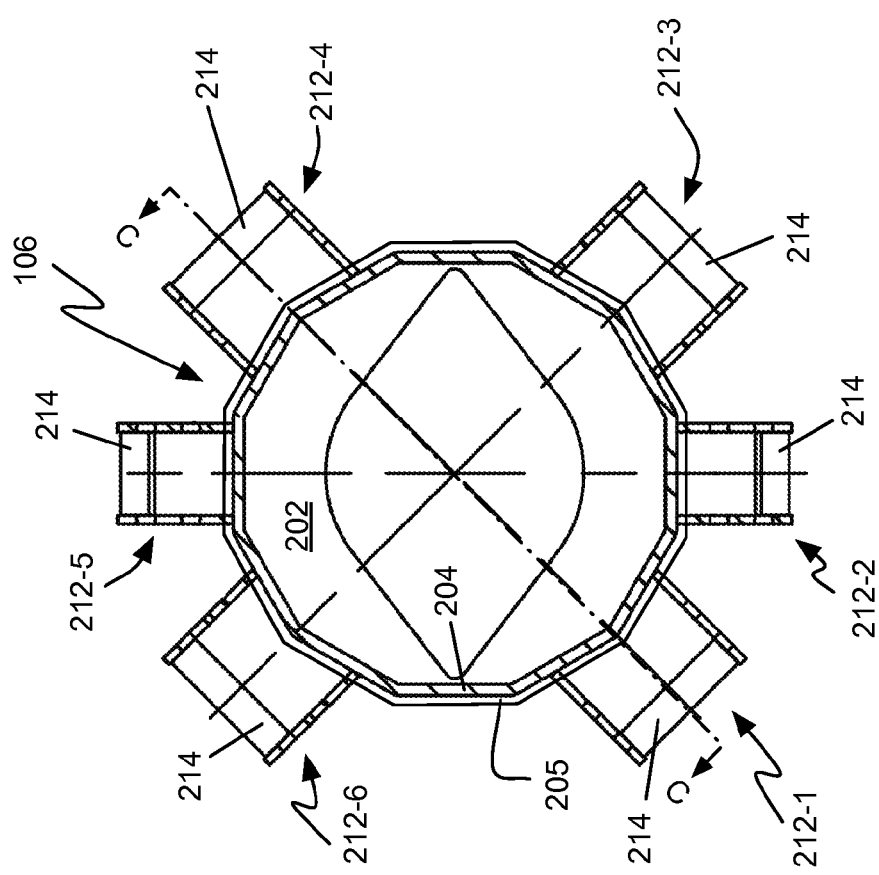
FIG. 2E
FIG. 2D

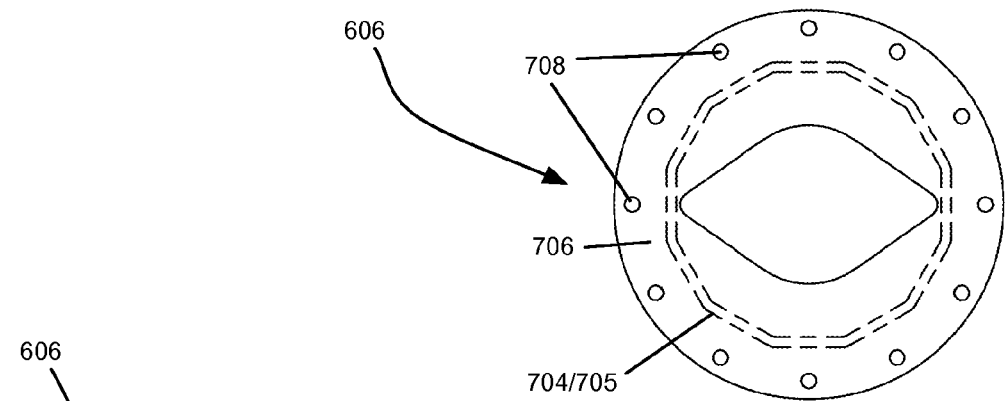
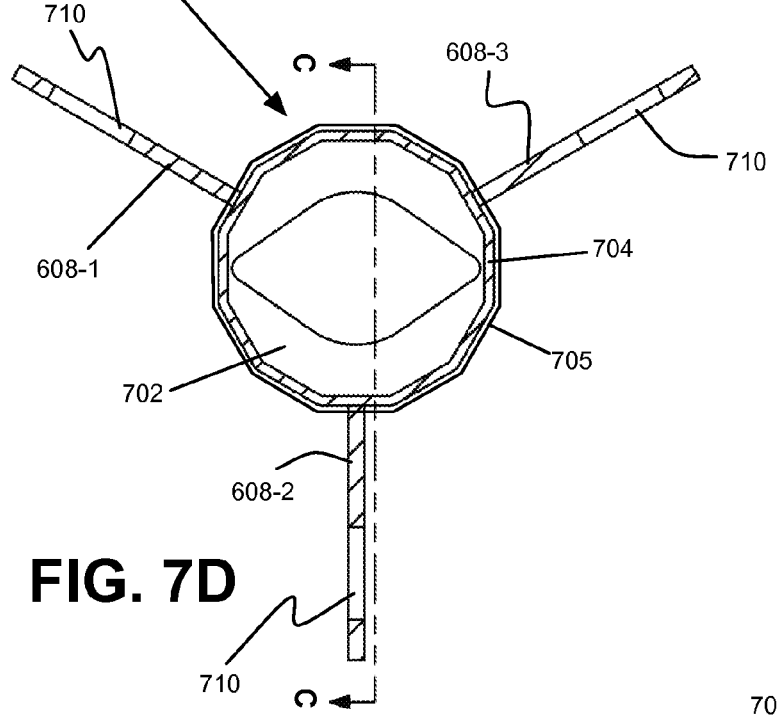
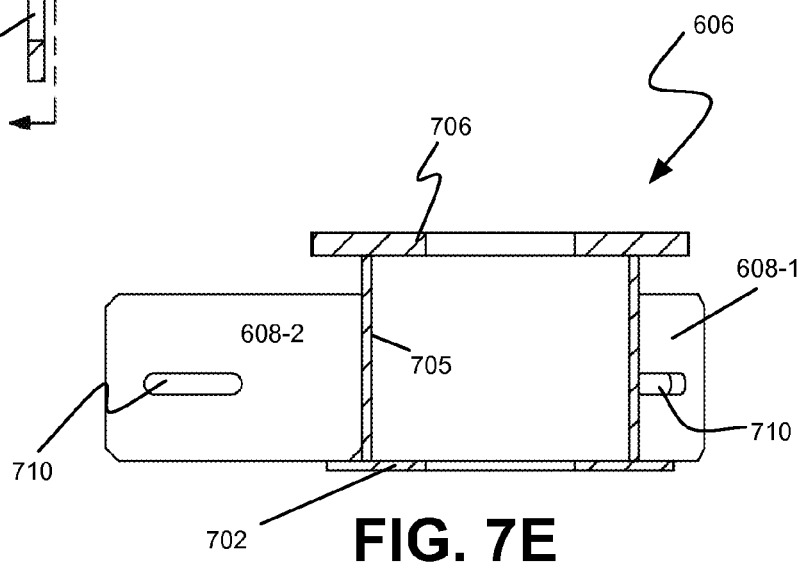

ADJUSTABLE MONOPOLE SUPPORT STRUCTURE

CROSS-REFERENCE TO RELATED APPLICATION

This application claims priority under 35. U.S.C. §119, based on U.S. Provisional Patent Application No. 61/721,167 filed Nov. 1, 2012, the disclosure of which is hereby incorporated by reference herein.

BACKGROUND OF THE INVENTION

The present invention relates to the field of monopole structures, and more particularly to support systems associated with such structures.

Monopole structures may be employed for housing or supporting elements such as antennae and other communications equipment, signage, electrical transmission and distribution lines, or lighting in an elevated position. Such structures often include a long, hollow pole structure connected to an underlying surface such as a concrete pad formed in the ground. Such monopole structures are typically subjected to wind or other types of forces along their length, which may cause the structure to bend or sway. These forces create a bending moment or torque about the base termination, which in turn stresses the base termination location and can lead to fatigue and eventual failure of the base termination material.

Conventional monopole structures are often rigidly connected to the ground via direct embedment, via concrete base plates, via concrete encased anchor bolts, or via drilled, concrete filled caissons. These methods for installing monopole structures require significant amounts of time and labor, and they impact the chosen construction site. Direct embedment and anchor bolt foundations require the use of heavy equipment, which can lead to an adverse impact on the site environment and expensive installation costs. In each case, installers must be concerned about what to do with displaced ground material from the construction site. In addition, when using concrete base plates or concrete caissons with anchor bolts, for example, time must be spent waiting for the concrete to cure and set up before a monopole structure can be installed. Accordingly, none of these options is sufficient when a strict timeline must be met and minimal site disturbance is required.

BRIEF DESCRIPTION OF THE DRAWINGS

FIG. 2B is a front view of the base platform of FIG. 2A;

FIG. 2C is a top view of the base platform of FIG. 2A taken along the line A-A in FIG. 2B;

FIG. 2D is a top view of the base platform of FIG. 2A taken along the line B-B in FIG. 2B;

FIG. 2E is a side view of the base platform of FIG. 2A take along the line C-C in FIG. 2D;

FIG. 7C is a top view of the base platform of FIG. 7A taken along the line A-A in FIG. 7B;

FIG. 7D is a top view of the base platform of FIG. 7A taken along the line B-B in FIG. 7B;

FIG. 7E is a side view of the base platform of FIG. 7A take along the line C-C in FIG. 7D;

DETAILED DESCRIPTION OF THE PREFERRED EMBODIMENTS

The following detailed description refers to the accompanying drawings. The same reference numbers in different drawings may identify the same or similar elements.

Consistent with implementations described herein, a number of support arm structures may be used to structurally connect a tubular monopole to a number of helical piers embedded within an environment surface. As described below, each support arm structure may be coupled to the monopole via an adjustable pin or bolt-based mounting assembly. More specifically, the adjustable mounting assembly may enable fine-tuned adjustment of the location of the helical piers relative to the support arm structures in three dimensions, thereby allowing the support assembly to adapt to variations in installation parameters, such as angle of inclination of the embedded piers. In contrast to existing monopole support systems using concrete base plates, concrete encased anchor bolts, or via drilled, concrete filled caissons, the described system may be employed in environments that are not conducive to the use of concrete or that are not conducive to the impact caused by driving conventional piers or piles. In addition, the described embodiments may be used to remediate or supplement existing monopole support structures with minimal environmental impact.

Figure 1A:
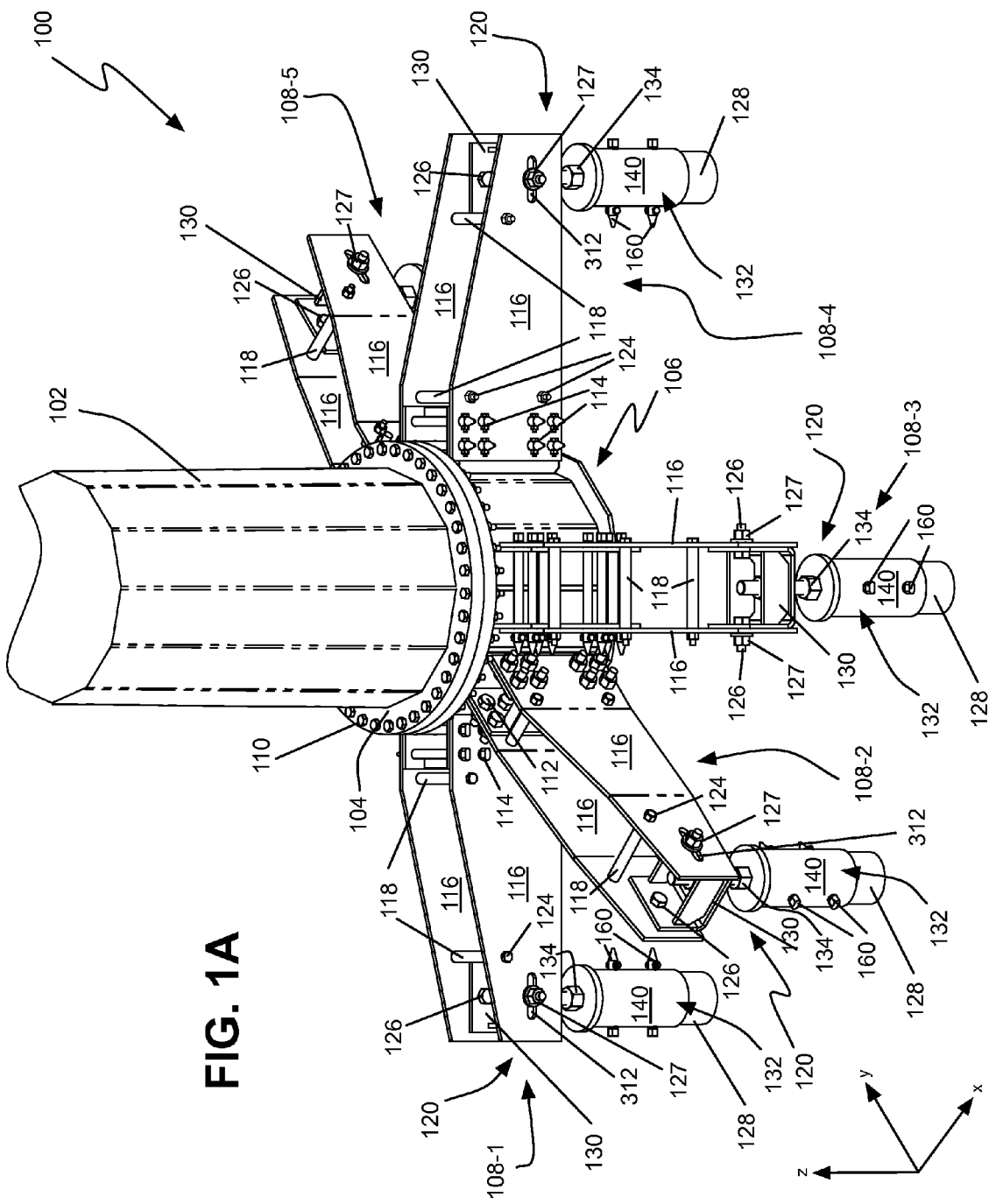
FIG. 1A is a isometric view of a portion of a monopole support structure consistent with embodiment described herein.
Figure 1B:
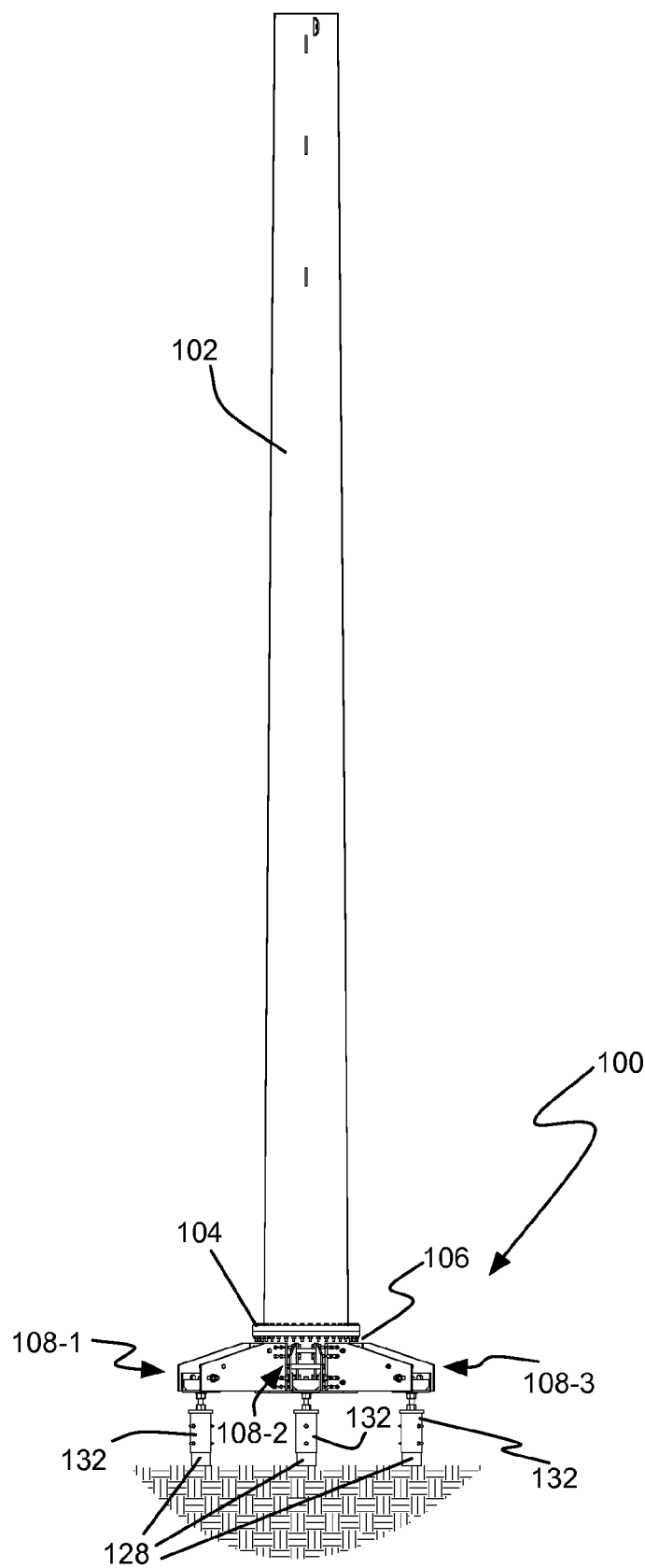
FIG. 1B is a front view of the monopole of FIG. 1A showing the monopole support structure installed into a support surface.
Figure 1C:
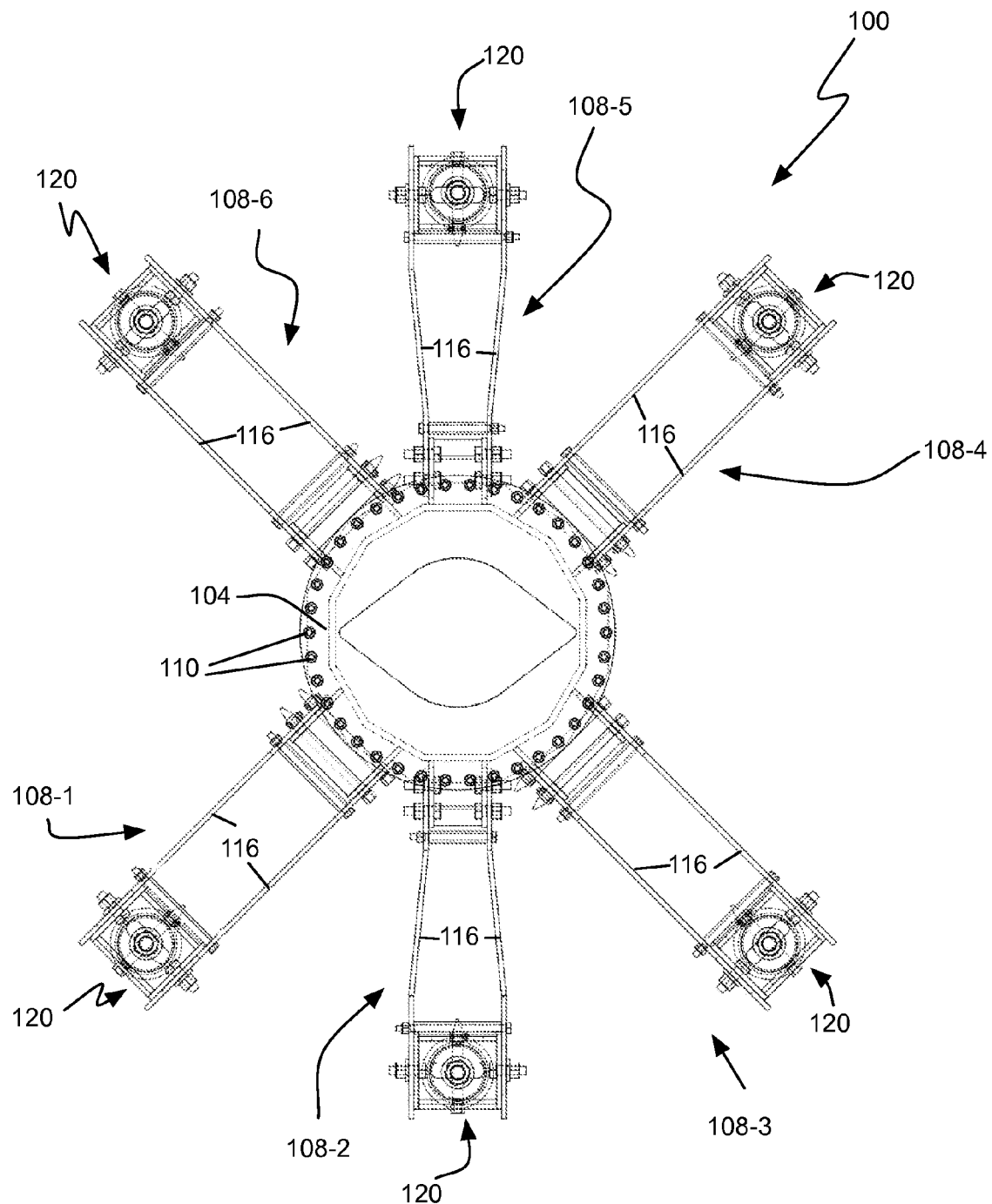
FIGS. 1C and 1D are top and front views, respectively, of the monopole support structure of FIG. 1A.
Figure 1D:
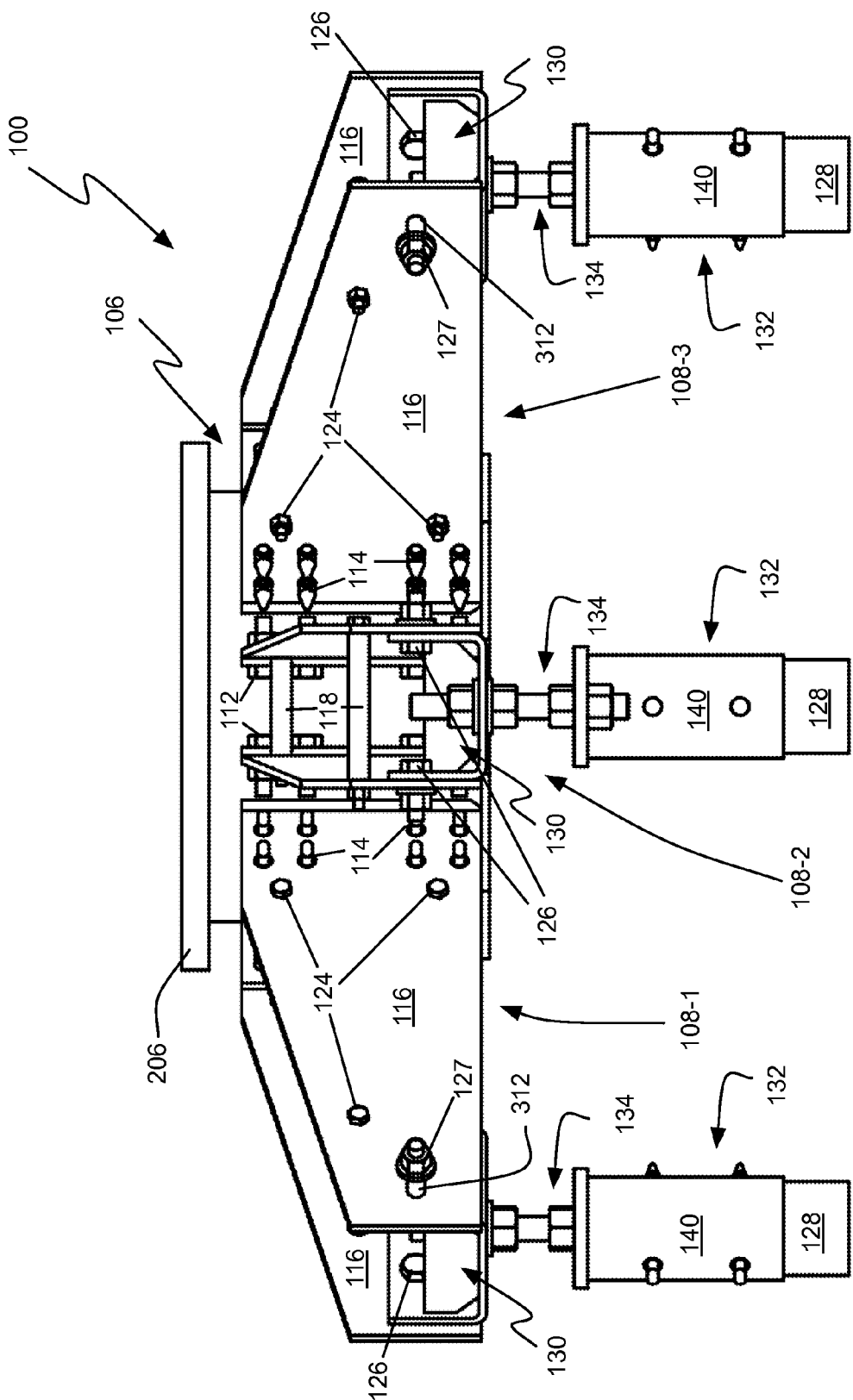

FIG. 1A is an isometric view of a portion of a support structure 100 for supporting a tubular monopole 102 consistent with an embodiment described herein. Tubular monopole 102 may include a substantially cylindrical or frusto-conical configuration. In some implementations, monopole 102 may be formed of galvanized tubular steel or similar material. FIG. 1B is a front view of tubular monopole 102 showing monopole 102 and support structure 100 installed into a support surface (e.g., the ground). FIG. 1C is a top view of monopole support structure 100. FIG. 1D is a front view of monopole support structure 100.

In some implementations, as shown in FIG. 1A, monopole 102 may include a multi-sided configuration, such as a 12-sided (dodecagon) configuration, comprising 12 sides, each having a same width and an angle of approximately 15° relative to each adjacent side. In addition, as shown in FIG. 1B, monopole 102 may have an extended length relative to its diameter, such length suitable for a given application. For example, a monopole for supporting high voltage power lines may be approximately 60-120 feet long or longer, while a monopole for supporting a traffic signal may be approximately 20-30 feet long. Embodiments described herein are suitable for monopole 102 having any particular length.

As shown in FIG. 1A, a monopole plate 104 may be welded to the bottom of monopole 102, e.g., via a full penetration groove weld or fillet welds. Monopole plate 104 may include a plurality of mounting holes formed in its outer periphery. In an exemplary embodiment, monopole plate 104 includes 38 mounting holes spaced about the periphery. As described below, the mounting holes in monopole plate 104 may align with mounting holes in a base platform 106 to secure monopole 102 to base platform 106.

Consistent with implementations described herein, monopole support structure 100 may include a base platform 106 and a plurality of support arm assemblies 108-1 to 108-6 (collectively referred to as "support arm assemblies 108" and individually as "support arm assembly 108"). In an exemplary implementation, monopole support structure 100 may include six support arm assemblies 108 projecting from a periphery of base platform 106 in a spaced relation relative to each other. For example, as shown in FIG. 1C, monopole support structure 100 includes a first set of three support arm assemblies 108-1 to 108-3 spaced approximately 45° relative to each other and a second set of three support arm assemblies 108-4 to 108-6 also spaced approximately 45° relative to each other and provided on an opposite side of base platform 106 relative to the first set of support arm assemblies 108-1 to 108-3. In other implementations, more or fewer support arm assemblies 108 may be used.

Figure 2A:
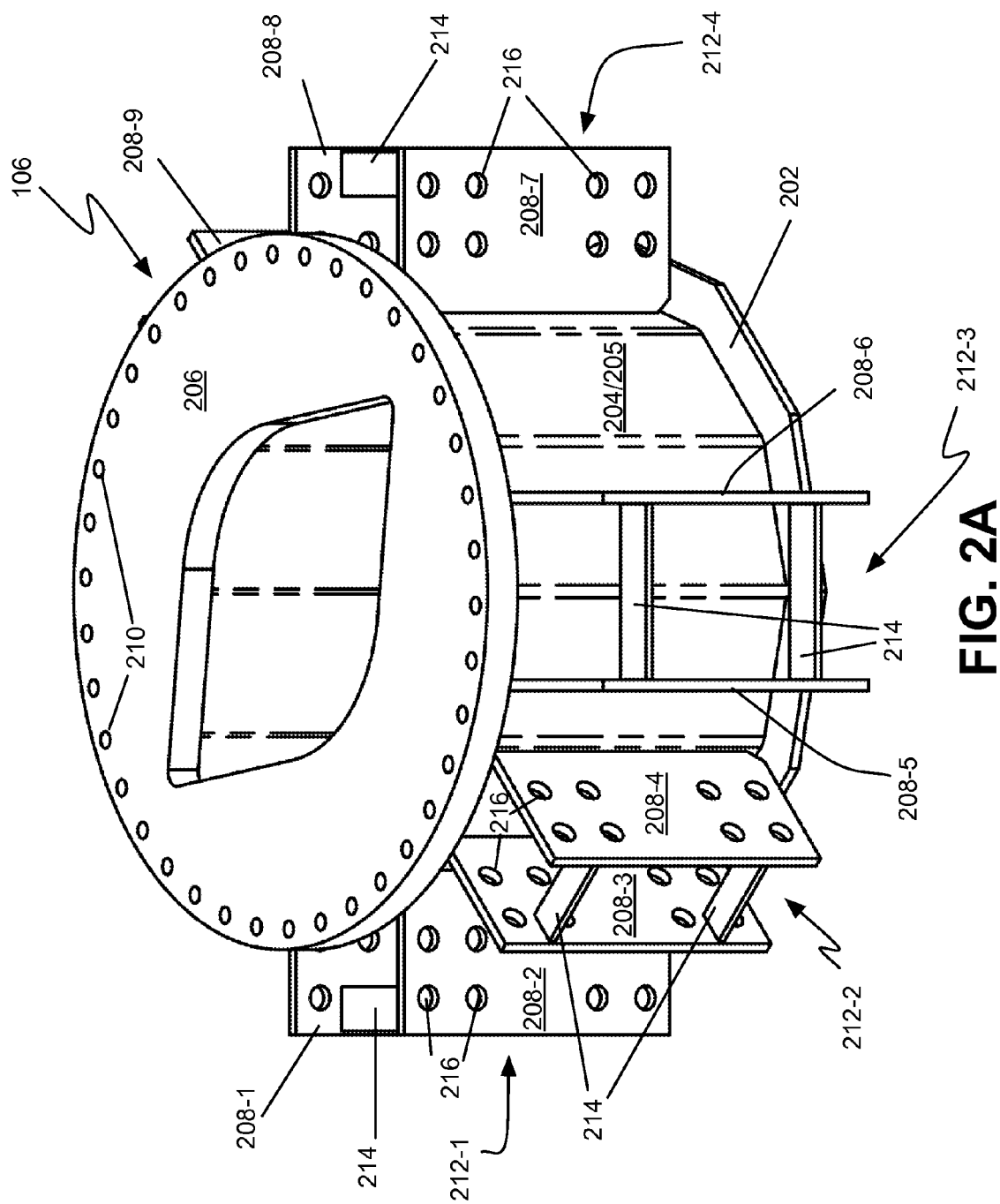
FIG. 2A is an isometric view of the base platform of FIG. 1A.

FIG. 2A is an isometric view of base platform 106. FIG. 2B is a front view of base platform 106. FIG. 2C is a top view of base platform 106 taken along the line A-A in FIG. 2B and FIG. 2D is a top view of base platform 106 taken along the line B-B in FIG. 2B. FIG. 2E is a side view of base platform 106 take along the line C-C in FIG. 2D. As shown in FIGS. 2A-2E, consistent with an embodiment described herein, base platform 106 may include a bearing plate 202, a support tube 204, a flange plate 206, and a plurality of mounting plates 208-1 to 208-12 (collectively referred to as "mounting plates 208" and individually as "mounting plate 208").

As shown in FIG. 2A, support tube 204 may comprise a tubular element that substantially conforms to the configuration of monopole 102. For example, support tube 204 may be a dodecagonal (12-sided) tube having a length and diameter whose dimensions are based on a length and diameter of monopole 102 to be supported. In one embodiment, for a monopole 102 having a length of approximately 50 feet and a maximum diameter of approximately 40 inches, support tube 204 may have a length of approximately two feet and a diameter of approximately 41 inches.

As shown in FIG. 2D, in one embodiment, support tube 204 may include an additional support layer 205 to support mounting plates 208. For example, support layer 205 may be formed of ¾" steel plate. As shown in FIGS. 2D and 2E, mounting plates 208 may project through support layer 205 and may be welded thereto.

Bearing plate 202 may have a generally planar configuration and is welded to a bottom end of support tube 204. For example, bearing plate 202 may be welded to support tube 204 via groove welds or fillet welds. Similar to bearing plate 202, flange plate 206 may also have a generally planar configuration and is welded to a top end of support tube 204. In one embodiment, bearing plate 202 may have a circular outer periphery and may include an outside diameter greater than a maximum diameter of both support tube 204 and monopole 102.

As shown, e.g., in FIGS. 2A and 2C, flange plate 206 may include a plurality of flange bolt mounting holes 210 formed in its outer periphery. As described briefly above, flange bolt mounting holes 210 may be configured to align with the mounting holes in monopole plate 104. As shown in FIG. 1, during assembly of monopole 102, a plurality of mounting bolts 110 may be inserted through the mounting holes in monopole plate 104 and flange bolt mounting holes 210 in flange plate 206 to secure monopole 102 to monopole support structure 100 using corresponding nuts (not shown). In addition, as shown in FIG. 2A, flange plate 206 may include a central aperture therethrough.

As shown in FIGS. 2A and 2D, in one exemplary embodiment, mounting plates 208 may be configured as "doublers," 212-1 to 212-6 (collectively referred to as "doublers 212" and individually as "doubler 212"). As shown, each doubler 212 includes a pair of mounting plates 208 separated by one or more stiffening or supporting gussets 214. As described below, support arm assemblies 108 are mounted to doublers 212 to provide a supporting structure for monopole 102.

To provide adequate support for doublers 212, mounting plates 208 may project through respective openings (e.g., slots) in support layer 205 and may be welded to support layer 205 at the slots (not shown) at the time of manufacture. Supporting gussets 214 may extend between mounting plates 208 in each doubler 212 and may be welded to each mounting plate 208 at opposing ends. For example, in one embodiment, each doubler 212 may include two supporting gussets 214 positioned at a location distal from support tube 204. As described above in relation to support arm assemblies 108, doublers 212 may be positioned in a spaced relation about support tube 204 to correspond to the locations of support arm assemblies 108.

In one implementation, as shown in FIG. 2D, doublers 212-2 and 212-5 may have a decreased width relative to doublers 212-1, 212-3, 212-4, and 212-6. This decreased width may allow the corresponding support arm assemblies 108 (e.g., 108-2 and 108-5) to be installed on base platform 106 in between adjacent support arm assemblies 108.

As shown in FIGS. 2A, 2B, and 2E, mounting plates 208 are provided with a plurality of mounting holes 216 to facilitate mounting of support arm assemblies 108 to doublers 212. For example, mounting holes 216 may be provided as two sets of four mounting holes 216. As described below, during assembly of monopole support structure 100, pins and or bolts may be used to secure support arm assemblies 108 to doublers 212 via mounting holes 216.

Returning to FIG. 1A, support arm assemblies 108 are secured to doublers 212 via bolts 112 (e.g., for support arm assemblies 108-2 and 108-5) or pins 114 (e.g., for support arm assemblies 108-1, 108-3, 108-4, and 108-6). Although the embodiment depicted in FIGS. 1A-1C implements both bolts 112 and pins 114, in other embodiments, either bolts 112 or pins 114 may be used for all support arm assemblies 108.

As shown in FIG. 1A, each support arm assembly 108 includes a pair of plates 116, spacers 118, and a pier mounting foot assembly 120. In one implementation, support arm assemblies 108 may include straight arm assemblies (e.g., assemblies 108-1, 108-3, 108-4, and 108-6) and bent arm assemblies (e.g., assemblies 108-2 and 108-5). The bent configuration of assemblies 108-2 and 108-5 may facilitate mounting to support base platform 106 in between adjacent support arm assemblies 108 without requiring differences in corresponding pier mounting foot assemblies 120. In other configurations, such an accommodation may not be necessary, and each of support arm assemblies 108 may include only straight arms.

Figure 3A:
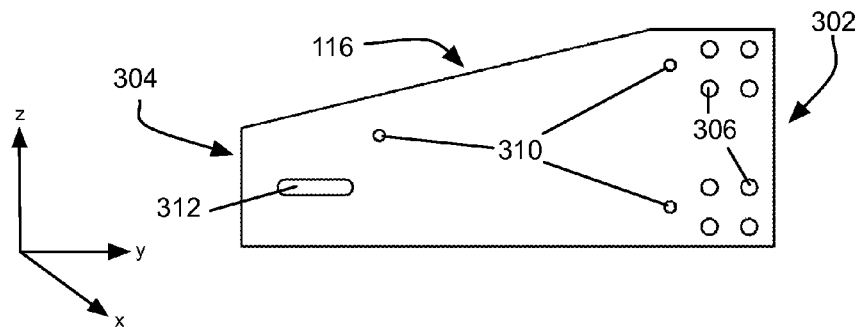
FIG. 3A is a side view of a straight plate of FIG. 1A.
Figure 3B:
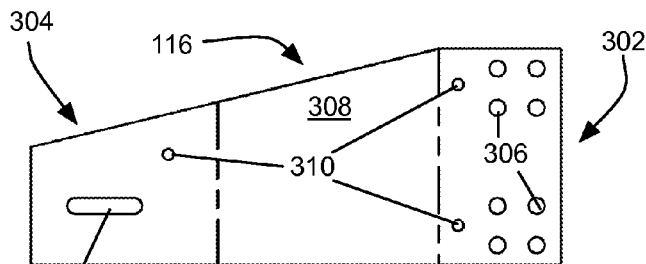
FIGS. 3B and 3C are side and top views, respectively, of a right hand plate of FIG. 1A.
Figure 3C:
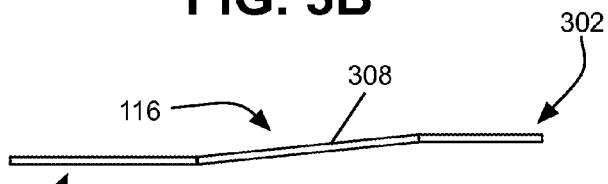
Figure 3D:
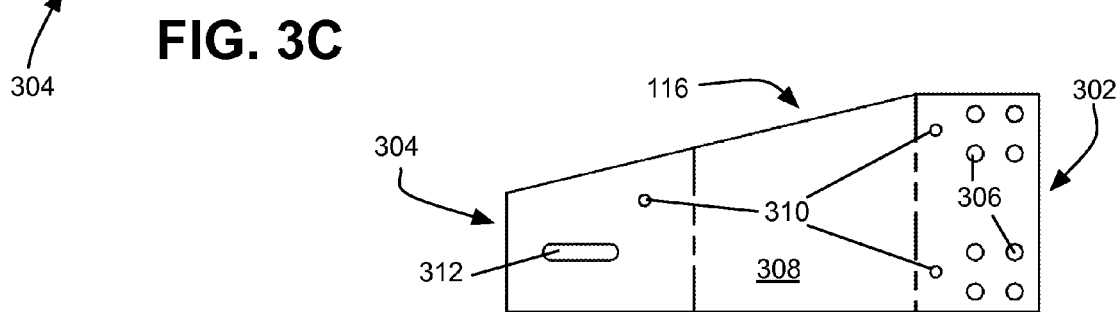
FIGS. 3D and 3E are side and top view, respectively, of a left hand plate of FIG. 1A.
Figure 3E:
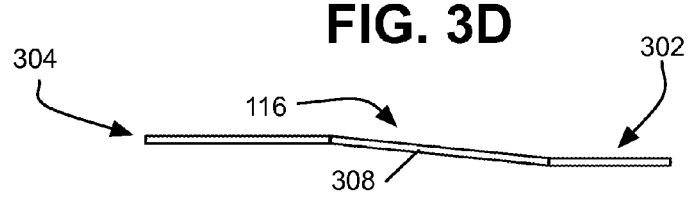

FIG. 3A is a side view of a plate 116 in a straight arm assembly 108 (e.g., 108-1, 108-3, 108-4, and 108-6). FIG. 3B is a side view of a right hand plate 116 in a bent arm assembly 108 (e.g., 108-2 and 108-5). FIG. 3C is a top view of the right hand plate 116 of FIG. 3B. FIG. 3D is a side view of a left hand plate 116 in a bent arm assembly 108 (e.g., 108-2 and 108-5). FIG. 3E is a top view of the right hand plate 116 of FIG. 3B.

As shown in FIGS. 3A-3E, each of plates 116 may include a generally polygonal shape having a base platform mounting end 302 and a helical pier mounting end 304 distal from base platform mounting end 302. In one implementation, helical pier mounting end 304 may have a height that is lower than a height of base platform mounting end 302, thus providing a generally angled shape to plates 116. In other embodiments, different plate configurations may be employed. As shown in FIGS. 3A, 3B, and 3D, base platform mounting end 302 of plates 116 may include mounting holes 306 configured to align with mounting holes 216 in mounting plates 108. During installation, mounting holes 306 in plates 116 of support arm assemblies 108 may be positioned to align with mounting holes 216 in mounting plates 108 and bolts 112/pins 114 may be used to secure support arm assemblies 108 to base platform 106.

As shown in FIGS. 3B-3E, plates 116 of bent arm assemblies 108 (e.g., 108-2 and 108-5) may include a bent interior section 308 that is positioned between base platform mounting end 302 and helical pier mounting end 304. As shown more specifically in FIGS. 3C and 3E, bent interior section 308 may provide a lateral translation of plate 116 from mounting end 302 and helical pier mounting end 304, such that, when a right hand plate 116 and a left hand plate 116 are combined to form bent arm assemblies 108-2 and 108-5, the separation between the right hand plate 116 and the left hand plate 116 is narrower at respective base platform mounting ends 302 than at helical pier mounting ends 304. As described above, this configuration allows for the bent arm assemblies 108-2 and 108-5 to be installed between adjacent straight arm assemblies 108.

As shown in FIGS. 3A, 3B, and 3D, each of plate 116 also include a plurality of spacer mounting holes 310 and a foot assembly mounting slot 312. As shown in FIG. 1A, during assembly of support arm assemblies 108, a plurality of spacers 118 may be provided between plates 116 in each support arm assembly. For example, spacers 118 may be formed of a rigid tubular material, such as steel, and may include an aperture therethrough for receiving a spacer mounting pin 124 therein. As shown, spacers 118 may be positioned between corresponding spacer mounting holes 310 in plates 116. Spacer mounting pins 124 may be inserted through spacer mounting holes 310 and through spacers 118 to rigidly form support arm assemblies 108 having a desired width between plates 116.

Foot assembly mounting slot 312 may be configured to include a width that is larger than its height. As shown in FIG. 1A, foot assembly mounting slot 312 is configured to receive foot mounting bolts 126 therein to secure pier mounting foot assembly 120 (e.g., using foot mounting nuts 127) to support arm assembly 108 in an adjustable manner. As described in additional detail below, the slotted configuration of foot assembly mounting slot 312 provides adjustment or movement of the positioning of pier mounting foot assembly 120 in a single dimension labeled as "y" (e.g., front to back) in relation to support arm assembly 108-2 in FIG. 1A.

As shown generally in FIG. 1A, each pier mounting foot assembly 120 provides a structure for coupling to exposed end of an embedded helical pier 128 and for enabling the secure coupling of the embedded helical pier 128 to monopole support system 100. More particularly, in conjunction with support arm assemblies 108, pier mounting foot assemblies 120 enable adjustable positioning of mounting foot assembly 120 relative to support arm assemblies 108 in three dimensions, labeled "x, "y", and "z" in FIG. 1A. Though a helical pier system is shown in FIG. 1A, it is understood that the support system described herein may include a variety of micropile and pier systems.

Figure 4A:
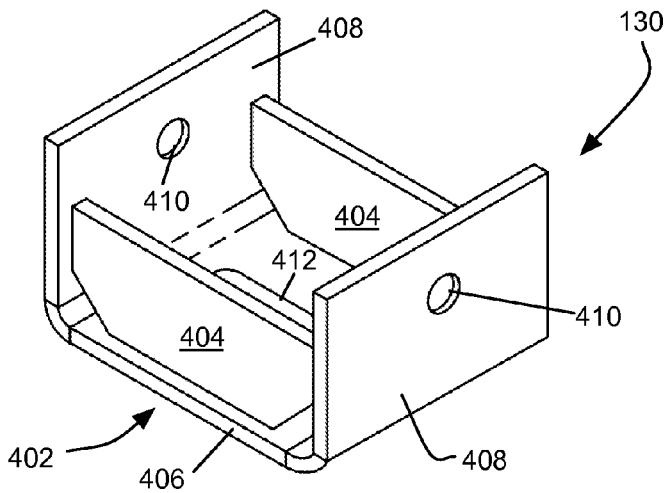
FIG. 4A is an isometric view of an exemplary foot plate assembly of FIG. 1A.
Figure 4B:
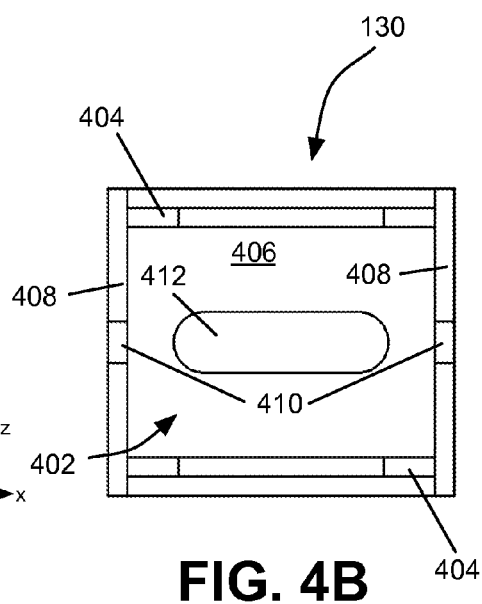
FIGS. 4B-4D are top, side, and front views, respectively, of the foot plate assembly of FIG. 4A.
Figure 4C:
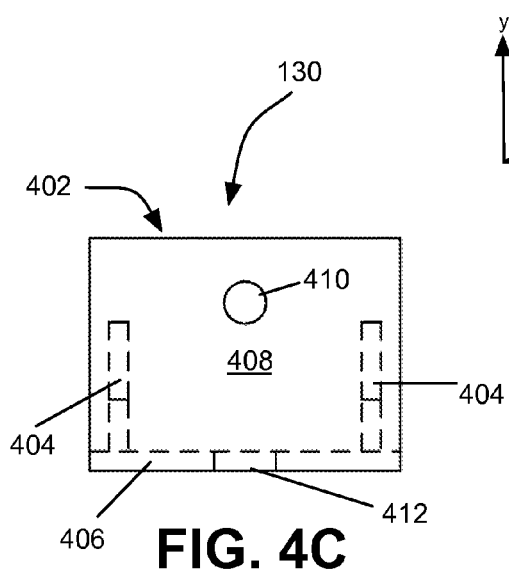
Figure 4D:
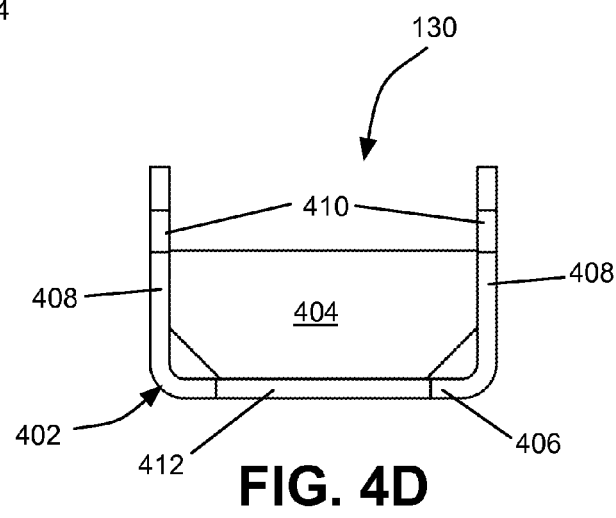
Figure 4E:
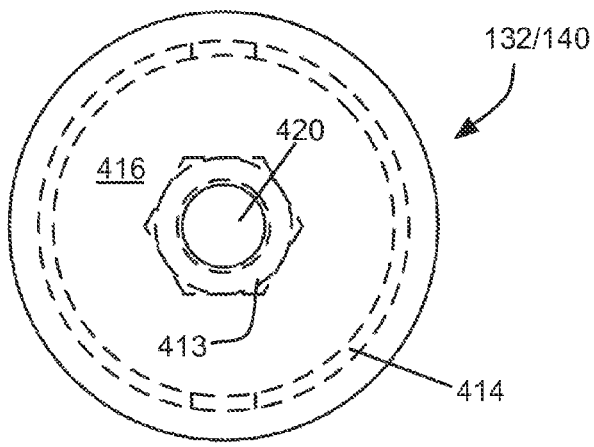
FIGS. 4E and 4F are top, and front views, respectively, of the exemplary pier cap assembly of FIG. 1A.
Figure 4G:
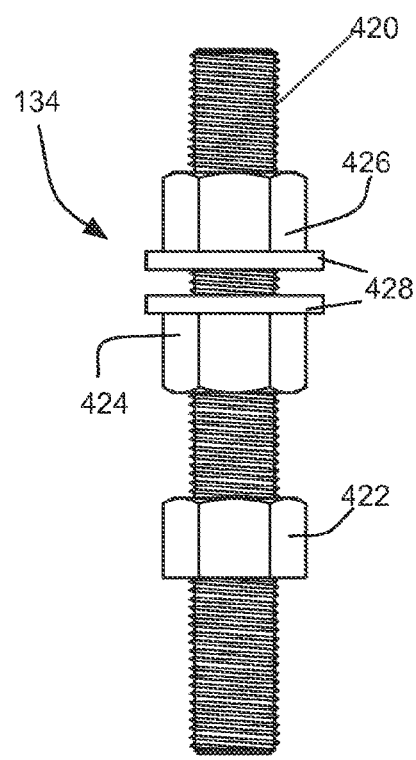
FIG. 4G is a front view of the exemplary anchor bolt assembly of FIG. 1A.
Figure 4F:
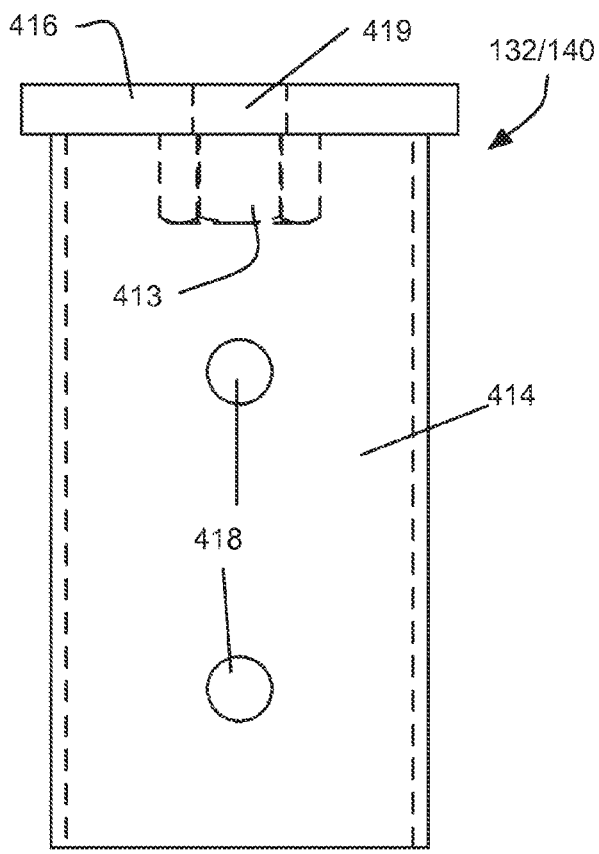

As shown in FIG. 1A, each pier mounting foot assembly 120 includes a foot plate assembly 130, a pier cap assembly 132, and an anchor bolt assembly 134. FIG. 4A is an isometric view of an exemplary foot plate assembly 130. FIGS. 4B-4D are top, side, and front views, respectively, of foot plate assembly 130. FIGS. 4E and 4F are top, and front views, respectively, of an exemplary pier cap assembly 132. FIG. 4G is a front view of an exemplary anchor bolt assembly 134.

As shown in FIGS. 4A-4D, in one exemplary embodiment, foot plate assembly 130 includes a main plate 402 and a pair of gusset plates 404. In one embodiment, main plate 402 may be formed of bent steel or similar material and may include bottom 406 and sides 408 formed perpendicularly relative to bottom 406. Gusset plates 404 may be welded to bottom 406 and sides 408 of main plate 402 to provide stiffness and rigidity to foot plate assembly 130. In one implementation, gusset plates 404 may include angled lower corners (e.g., adjacent to the interface between sides 408 and bottom 406 in main plate 402). The angled lower corners may allow fluid (e.g., rain) to flow off of main plate 402.

Although main plate 402 is depicted in FIGS. 4A-4D as being formed of a single piece of sheet material, in other implementations, main plate 402 may be welded from separate bottom and side components.

As shown in FIGS. 4A-4D, sides 408 of main plate 402 may include mounting holes 410 formed therein. Consistent with embodiments described herein, mounting holes 410 in main plate 402 may be configured to align with foot assembly mounting slot 312 in support arm assembly 108 (e.g., in plates 116). During assembly, as shown in FIGS. 1A and 1D, foot mounting bolt 126 may be used (along with a corresponding foot mounting nut 127) to secure foot plate assembly 130 to support arm assembly 106 via mounting holes 410 and foot assembly mounting slot 312, respectively. Furthermore, consistent with embodiments described herein, adjustments to the horizontal positioning of foot plate assembly 130 relative to support arm assembly 106 may be made by moving foot mounting bolts 126 within foot assembly mounting slot 312 prior to tightening foot mounting nut 127.

As shown in FIG. 4B, consistent with embodiments described herein, bottom 406 of main plate 402 may include an anchor bolt mounting slot 412 formed therein. Anchor bolt mounting slot 412 may be configured to include length that is larger than its width, resulting in an elongated opening. As shown in FIG. 1A, anchor bolt mounting slot 412 is configured to receive anchor bolt assembly 134 therein. As described below, anchor bolt assembly 134 is secured to an exposed end of embedded helical pier 128. As described in additional detail below, the slot form of anchor bolt mounting slot 412 allows adjustment or movement of anchor bolt assembly 134 within foot plate assembly 130 in a single dimension labeled as "x" (e.g., side to side) in relation to support arm assembly 108-2 in FIG. 1A.

Figure 5:
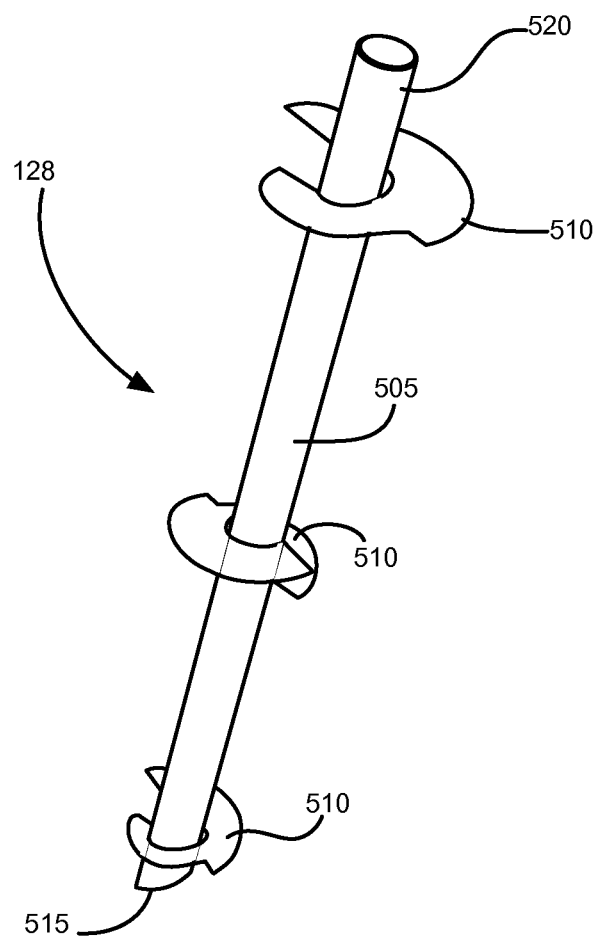
FIG. 5 is an isometric view of an exemplary helical pier usable with the support structure of FIGS. 1A-4G.

As shown in FIGS. 4E and 4F, pier cap assembly 132 includes a pier cap 140 and a pier cap nut 413. In one embodiment, pier cap 140 includes a generally tubular sleeve portion 414 and a top plate 416. As shown in FIG. 5, the top end of helical piers 128 is typically formed of round tubing or pipe. Accordingly, tubular sleeve portion 414 may be configured to include an inside diameter corresponding to an outside diameter of the top end of the helical piers 128. In one embodiment, the top end may be approximately eight inches. Furthermore, sleeve portion 414 may include a plurality of pier fixing holes 418 formed therethrough. Top plate 416 encloses one end of sleeve portion 414 and includes an anchor bolt receiving aperture 419 formed therethrough. Pier cap nut 413 may be aligned with anchor bolt receiving aperture 419 and secured to an interior surface of top plate 416 (e.g., by welding). Similarly, top plate 416 may be secured (e.g., by welding) to sleeve portion 414.

Upon assembly, the exposed end of helical pier 128 is inserted into sleeve portion 414 of pier cap 140. Mounting holes are drilled (e.g., on site) through helical pier 128 through pier fixing holes 418. As shown in FIG. 1A, pier fixing pins 160 are inserted through pier fixing holes 418 (and corresponding mounting holes drilled into helical pier 128) and secured (e.g., via pin bolts, nuts, etc.).

Referring to FIG. 4G, anchor bolt assembly 134 may include an anchor bolt 420, a jam nut 422, a leveling nut 424, a top nut 426, and washers 428. In one implementation, anchor bolt 420 may included a threaded steel shaft configured to correspond to interior threads in pier cap nut 413, jam nut 422, leveling nut 424, and top nut 426. A length of anchor bolt 420 may allow for adjustable installation of helical pier 128 relative to support arm assembly 108 via foot plate assembly 130.

For example, in operation, jam nut 422 is configured to secure anchor bolt assembly to pier cap 140, while leveling nut 424 and top nut 426 enable vertical positioning of anchor bolt assembly 134 (and thus, helical pier 128) relative to foot plate assembly 130. More specifically, during installation, anchor bolt 420 is inserted through top plate 416 in pier cap assembly 132 and into pier cap nut 413. Jam nut 422 is tightening down onto top plate 416 to secure anchor bolt 420 to pier cap assembly 132. Leveling nut 424 and one of washers 428 are then threaded onto anchor bolt 420.

Support arm assembly 108 may then be lowered onto the anchor bolt 420. For example, anchor bolt 420 may be received within anchor bolt mounting slot 412 in main plate 402 of foot plate assembly 130. Once a suitable positioning of helical pier 128 relative to a respective support arm assembly 108 is determined (e.g., determined to cause support arm assemblies 108 to be coplanar with each other), leveling nut 424 may be positioned in a corresponding location on anchor bolt 420. As briefly described above, the slotted nature of anchor bolt mounting slot 412 allows the location of anchor bolt 420 (and hence helical pier 128) to be positioned in variable locations in relation to foot plate assembly 130.

Once all six pier mounting foot assembly 120 have been positioned within their respective support arm assemblies 108, top nuts 426 and foot mounting nuts 127 are tightened to secure helical pier 128 to monopole support structure 100 in a level and plumb orientation. Consistent with embodiments described herein, such an adjustable configuration allows for helical piers 128 to be precisely secured even where the exposed ends deviate from a true center by as much as three inches or more.

FIG. 5 is an isometric view of one of helical piers 128. As shown, helical pier 128 includes a shaft portion 505 and a number of auger or blade portions 510. An operating end 515 of shaft portion 505 may include a pointed end for enabling pier 128 to more easily penetrate the Earth during installation. A retaining end 520 of shaft portion 505 may be exposed for connection to pier cap assembly 132 as described above.

Following insertion of helical pier 128 into the Earth to a desired or predetermined depth, shaft portion 505 may be trimmed or cut so that retaining end 520 projects from the Earth by a predetermined amount. As shown in FIGS. 1A and 1B, helical piers 128 may be inserted into the Earth at locations radially aligned with pier mounting foot assemblies 120. Retaining ends 520 of helical piers 128 may be received within sleeve portions 414 of pier cap assemblies 132 as described above. Mounting holes may be drilled through retaining ends 520 in the field to align with pier fixing holes 418 in sleeve portion 414. Pins 160 may be received through pier fixing holes 418 and the field drilled holes in helical piers 128 and secured (e.g., via clips, not/bolt, etc.).

Figure 6A:
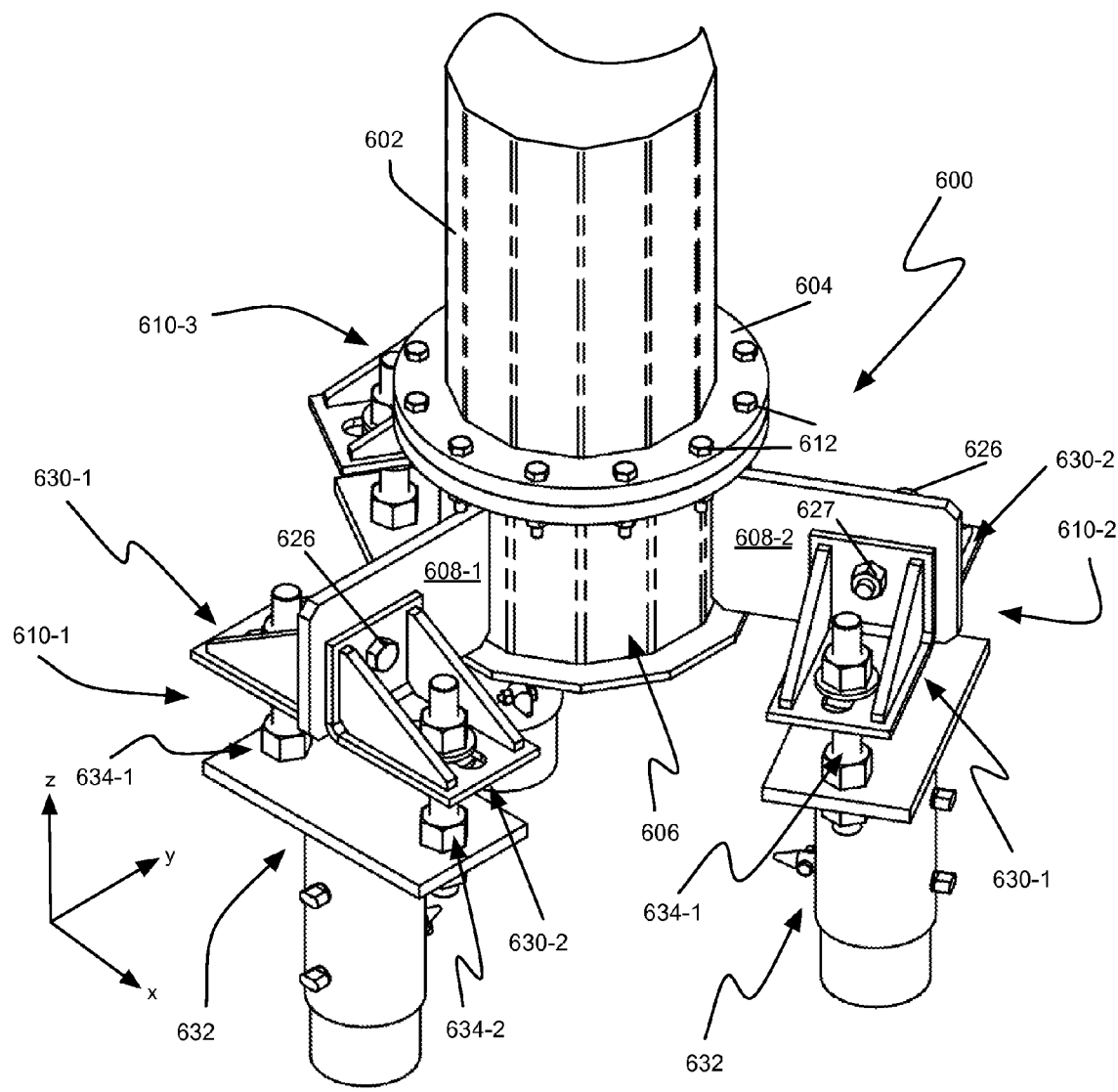
FIG. 6A is a isometric view of a portion of a monopole support structure consistent with another embodiment described herein.
Figure 6B:
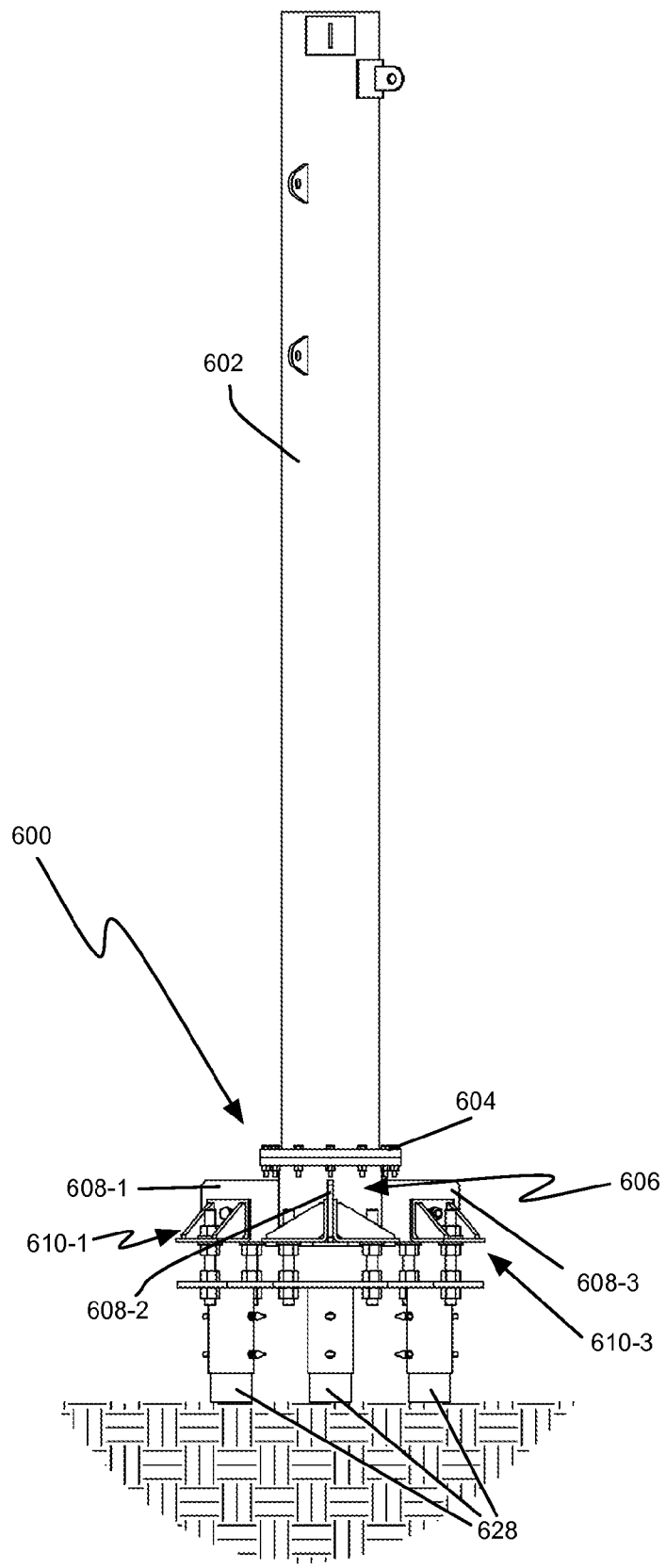
FIG. 6B is a front view of the monopole of FIG. 6A showing the monopole support structure installed into a support surface.
Figure 6C:
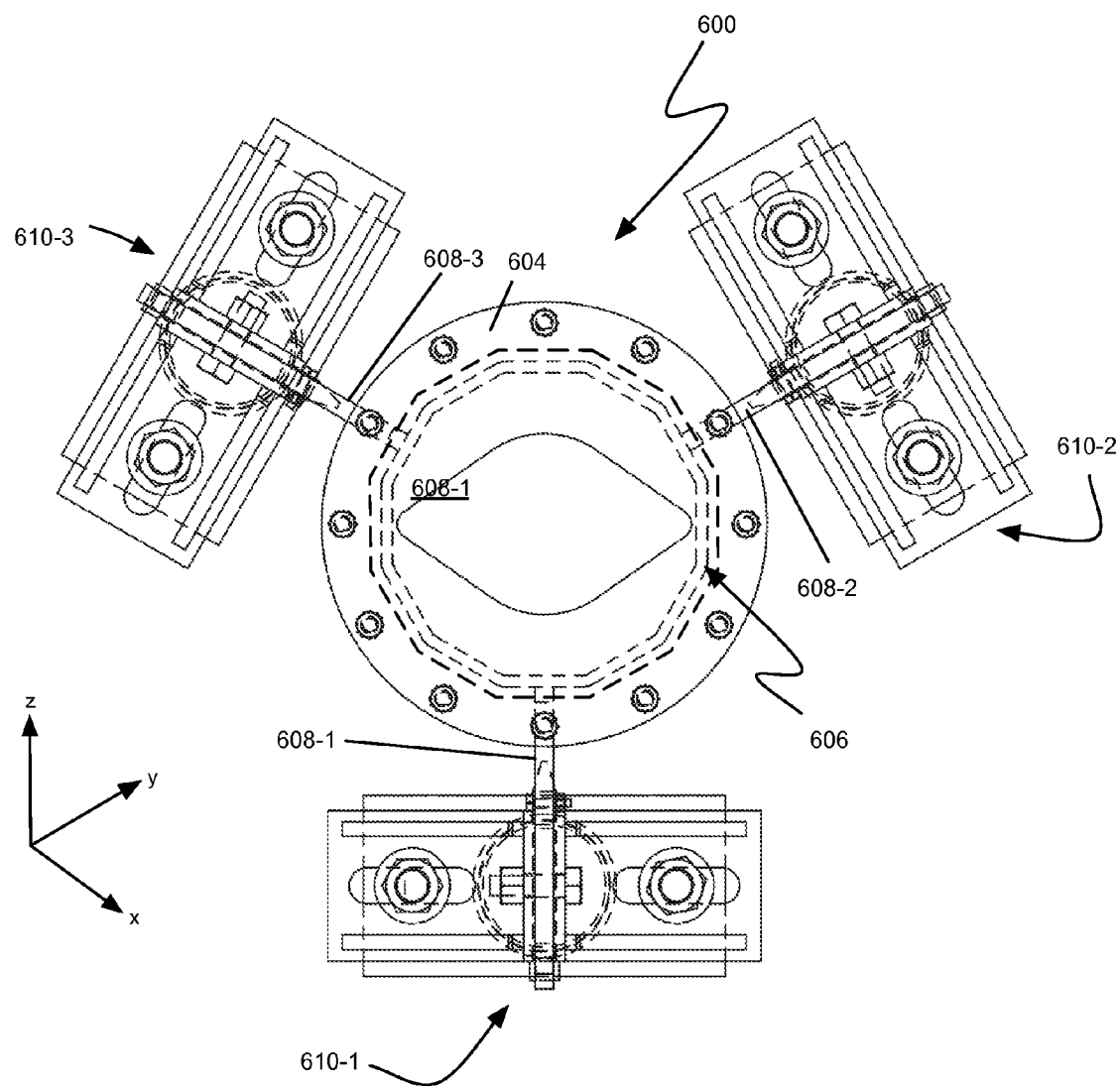
FIGS. 6C and 6D are top and front views, respectively, of the monopole support structure of FIG. 6A.
Figure 6D:
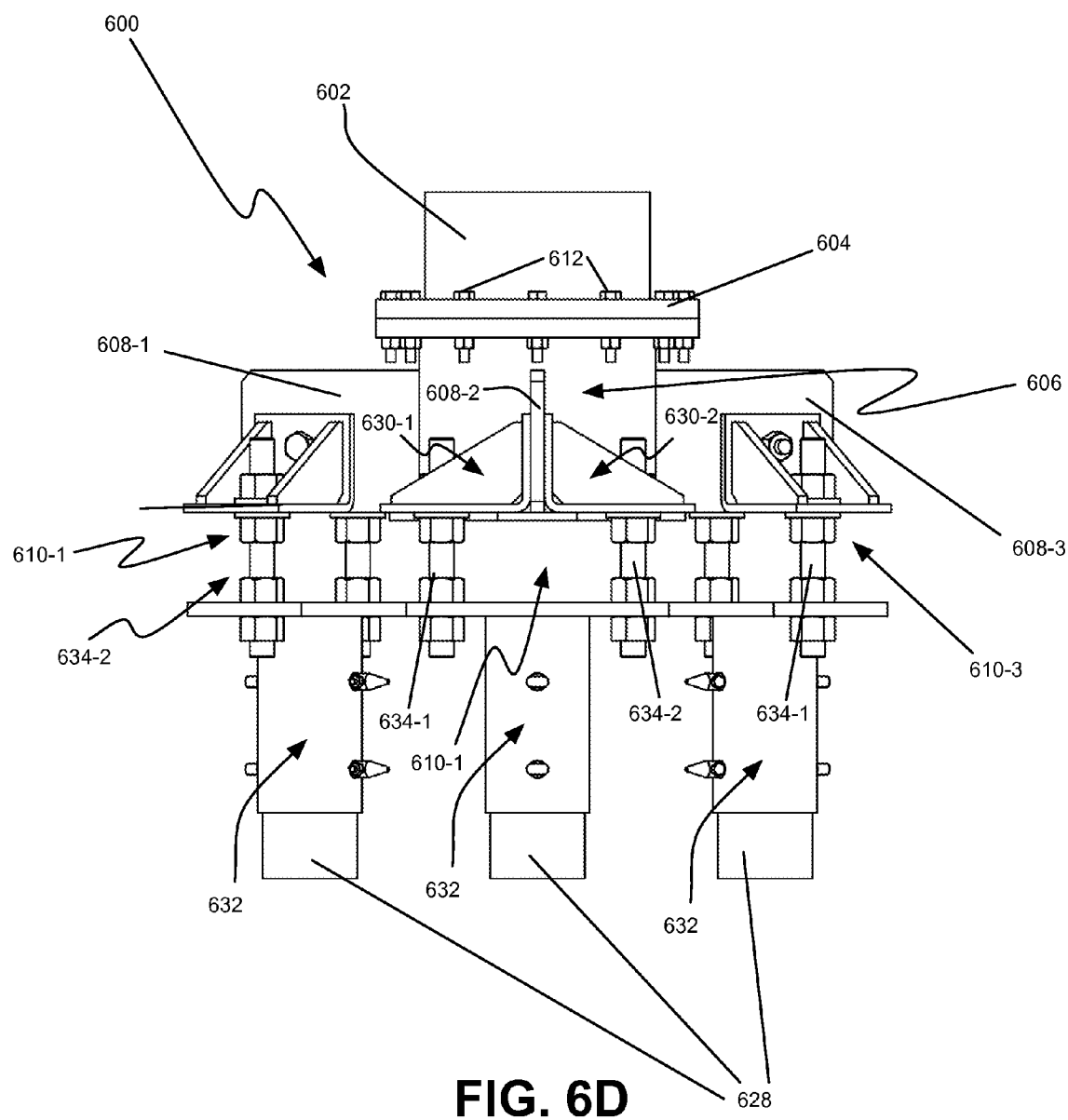

FIG. 6A is an isometric view of a portion of a support structure 600 for supporting a tubular monopole 602 consistent with another embodiment described herein. Similar to monopole 102 described above, monopole 602 may include a substantially cylindrical or frusto-conical configuration formed of galvanized tubular steel or similar material. FIG. 6B is a front view of tubular monopole 602 installed into a support surface (e.g., the ground). FIG. 6C is a top view of monopole support structure 600. FIG. 6D is a front view of monopole support structure 600.

As shown in FIG. 6A, a monopole plate 604 may be welded to the bottom of monopole 602, e.g., via groove welds or fillet welds. Monopole plate 604 may include a plurality of mounting holes formed in its outer periphery. In an exemplary embodiment, monopole plate 604 includes 12 mounting holes spaced about the periphery. As described below, the mounting holes in monopole plate 604 may align with mounting holes in a base platform 606 to secure monopole 602 to base platform 606.

Consistent with implementations described herein, monopole support structure 600 may include a base platform 606, a plurality of mounting plates 608 (collectively referred to as "mounting plates 608" and individually as "mounting plate 608"), and a plurality of pier mounting foot assemblies 610-1 to 610-3 (collectively referred to as "pier mounting foot assemblies 610" and individually as "pier mounting foot assembly 610"). In an exemplary implementation, monopole support structure 600 may include three mounting plates 608 that project from a periphery of base platform 606 in a spaced relation relative to each other. For example, as shown in FIG. 6C, monopole support structure 600 illustrates three mounting plates 608-1 to 608-3 spaced approximately 120° relative to each other. In other implementations, more or fewer mounting plates 608 may be used.

Figure 7A:
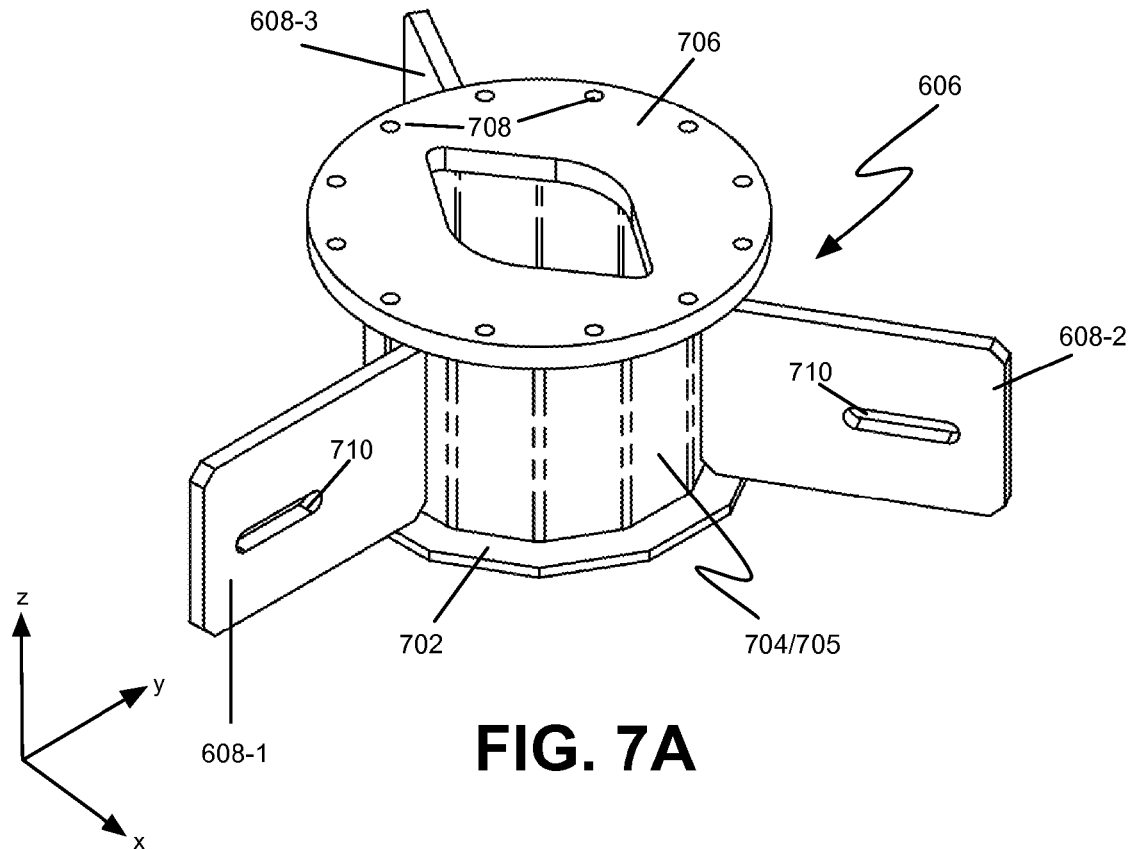
FIG. 7A is an isometric view of the base platform of FIG. 6A.
Figure 7B:
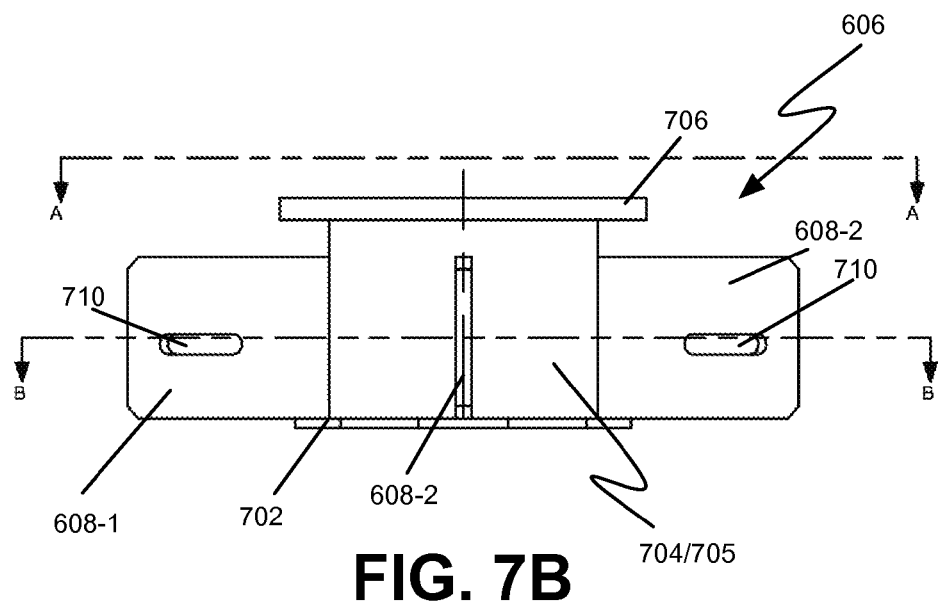
FIG. 7B is a front view of the base platform of FIG. 7A.

FIG. 7A is an isometric view of base platform 606. FIG. 7B is a front view of base platform 606. FIG. 7C is a top view of base platform 606 taken along the line A-A in FIG. 7B and FIG. 7D is a top view of base platform 606 taken along the line B-B in FIG. 7B. FIG. 7E is a side view of base platform 606 take along the line C-C in FIG. 7D. As shown in FIGS. 7A-7E, consistent with an embodiment described herein, base platform 606 may include a bearing plate 702, a support tube 704, and a flange plate 706.

As shown in FIG. 7A, support tube 704 may comprise a tubular element that substantially conforms to the configuration of monopole 602. For example, support tube 704 may be a dodecagonal (12-sided) tube having a length and diameter whose dimensions are based on a length and diameter of monopole 602 to be supported. In one embodiment, for a monopole 602 having a length of approximately 20 feet and a maximum diameter of approximately 22 inches, support tube 704 may have a length of approximately 16 inches and a diameter of approximately 22 inches.

As shown in FIG. 7D, in one embodiment, support tube 704 may include an additional support layer 705 to support mounting plates 608. For example, support layer 705 may be formed of ¾" steel plate. As shown in FIGS. 7D and 7E, mounting plates 608 may project through support layer 705 and may be welded thereto.

Bearing plate 702 may have a generally planar configuration and is welded to a bottom end of support tube 704. For example, bearing plate 702 may be welded to support tube 704 via groove welds or fillet welds. Similar to bearing plate 702, flange plate 706 may also have a generally planar configuration and is welded to a top end of support tube 704. In one embodiment, bearing plate 702 may have a circular outer periphery and may include an outside diameter greater than a maximum diameter of both support tube 704 and monopole 602.

As shown, e.g., in FIGS. 7A and 7C, flange plate 706 may include a plurality of flange bolt mounting holes 708 formed in its outer periphery. As described briefly above, flange bolt mounting holes 708 may be configured to align with the mounting holes in monopole plate 604. As shown in FIG. 6A, during assembly of monopole 602, a plurality of mounting bolts 612 may be inserted through the mounting holes in monopole plate 604 and flange bolt mounting holes 708 in flange plate 706 to secure monopole 602 to monopole support structure 600 using corresponding nuts (not shown).

As shown in FIG. 7A, in one exemplary embodiment, mounting plates 608 include steel plates that project from support tube 704. Although depicted in FIGS. 7A-7E as including singular plates, in other configurations, mounting plates 608 may be configured as "doublers," similar to doublers 212 described above. To provide adequate support, mounting plates 608 may project through respective openings (e.g., slots) in support layer 705 and may be welded to support layer 705 at the slots (not shown) at the time of manufacture.

As shown in FIGS. 7A, 7B, and 7E, each mounting plate 608 is provided with a foot plate assembly mounting slot 710 to facilitate adjustable mounting of pier mounting foot assembly 610 to mounting plates 608. For example, each foot plate assembly mounting slot 710 may be positioned in a portion of mounting plate 608 distal from support tube 704. Further, as shown in FIGS. 7A, 7B and 7E, foot plate assembly mounting slot 710 may be configured to include a width that is greater that its height. For example, in relation to mounting plate 608-1 in FIG. 7A, a "y" dimension of foot plate assembly mounting slot 710 is larger than its "z" dimension, thereby allowing movement of a bolt or pin inserted therethrough in the "z" dimension.

As shown in FIG. 6A, foot plate assembly mounting slots 710 in mounting plates 608 are configured to receive foot plate mounting bolts 626 therein to secure pier mounting foot assemblies 610 (e.g., using foot mounting nuts 627) in an adjustable manner. As described in additional detail below, the slotted configuration of foot plate assembly mounting slot 710 provides adjustment of the positioning of pier mounting foot assemblies 610 in a single dimension (e.g., foot assembly 610-1 may be moved in a direction labeled as "y" (e.g., front to back) in FIG. 6A).

As shown generally in FIG. 6A, each pier mounting foot assembly 610 provides a structure for coupling to exposed end of an embedded helical pier 628 and for enabling the secure coupling of the embedded helical pier 628 to monopole support system 600. More particularly, in conjunction with mounting plates 608, pier mounting foot assemblies 610 enable adjustable positioning relative to mounting plates 608 in three dimensions, labeled "x", "y", and "z" in FIG. 6A (as shown in relation to mounting plate 608-1). It should be understood that relative axes are different for each mounting plate 608.

Figure 8A:
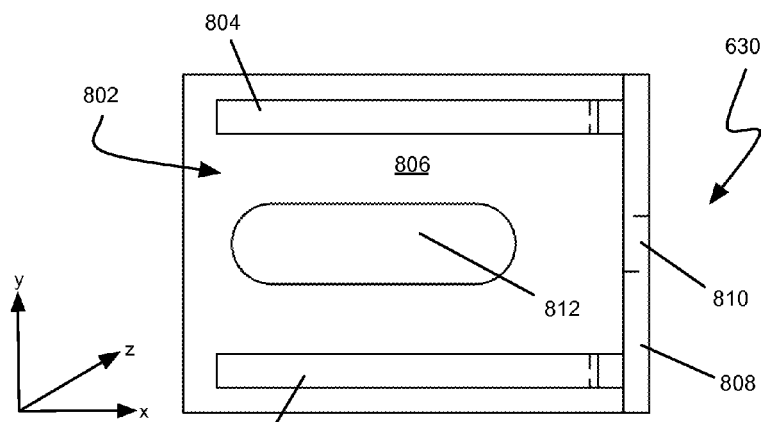
FIG. 8A-8C are top, side, and front views, respectively, of the foot plate assembly of FIG. 6A.
Figure 8B:
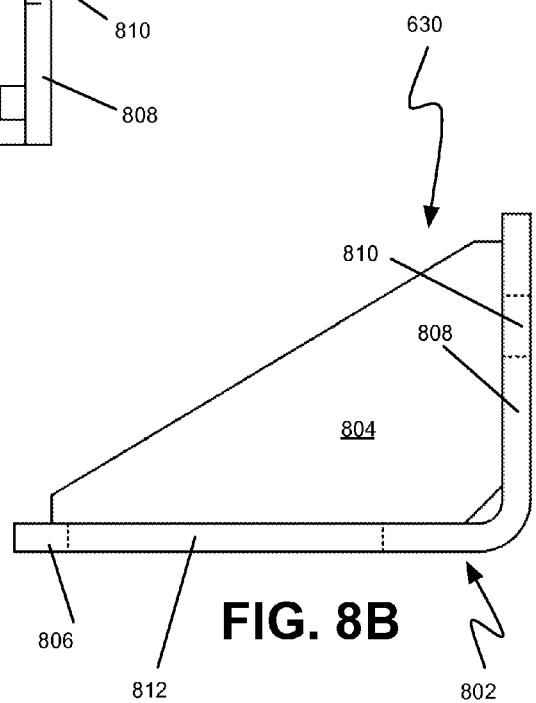
Figure 8C:
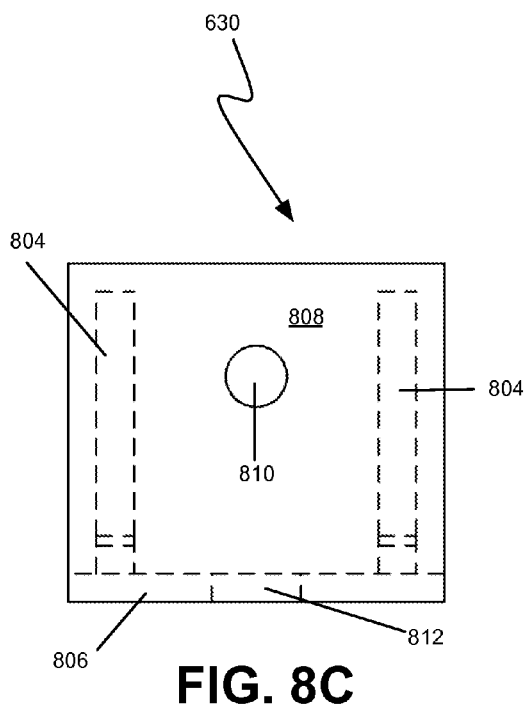
Figure 8D:
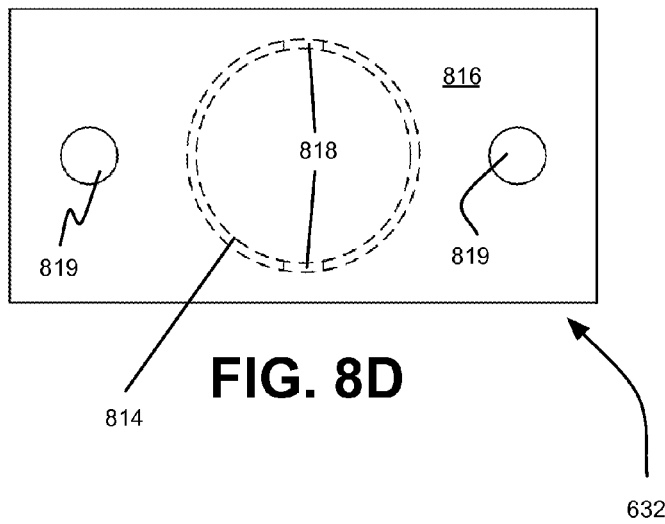
FIGS. 8D and 8E are top, and front views, respectively, of the exemplary pier cap assembly of FIG. 6A.
Figure 8E:
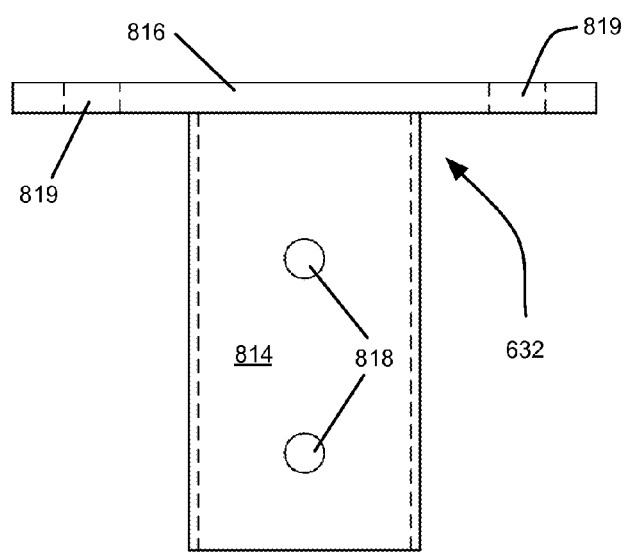
Figure 8F:
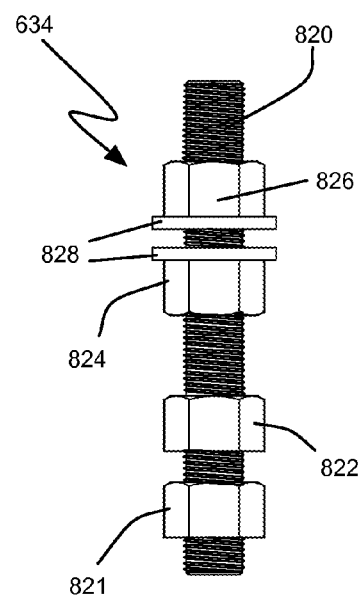
FIG. 8F is a front view of the exemplary anchor bolt assembly of FIG. 6A.

As shown in FIG. 6A, each pier mounting foot assembly 610 includes a pair of foot plate assembly 630-1 and 630-2 (collectively referred to as "foot plate assemblies 630" and individually as "foot plate assembly 630"), a pier cap assembly 632, and a pair of anchor bolt assembly 634-1 and 634-2 (collectively referred to as "anchor bolt assemblies 634" and individually as "anchor bolt assembly 634"). FIGS. 8A-8C are top, side, and front views, respectively, of foot plate assembly 630. FIGS. 8D and 8E are top, and front views, respectively, of an exemplary pier cap assembly 632. FIG. 8F is a front view of an exemplary anchor bolt assembly 634.

As shown in FIGS. 8A-8C, in one exemplary embodiment, each foot plate assembly 630 includes a main plate 802 and a pair of support plates 804. In one embodiment, main plate 802 may be formed of bent steel or similar material and may include bottom 806 and side 808 formed perpendicularly relative to bottom 806. Support plates 804 may be welded to bottom 806 and side 808 of main plate 802 to provide stiffness and rigidity to foot plate assembly 630. In one implementation, support plates 804 may include angled lower corners (e.g., adjacent to the interface between side 808 and bottom 806 in main plate 802). The angled lower corners may allow fluid (e.g., rain) to flow off of main plate 802.

Although main plate 802 is depicted in FIGS. 8A-8C as being formed of a single piece of sheet material, in other implementations, main plate 802 may be welded from separate bottom and side components.

As shown in FIGS. 8A-8C, side 808 of main plate 802 may include a mounting hole 810 formed therein. Consistent with embodiments described herein, mounting hole 810 in main plate 802 may be configured to align with foot plate assembly mounting slot 710 in mounting plates 608. During assembly, as shown in FIGS. 6A and 6D, foot mounting bolt 626 may be used (along with a corresponding foot plate mounting nut 627) to secure a pair of foot plate assemblies 630 to mounting plate 608 via mounting holes 810 and foot plate assembly mounting slot 710, respectively. As shown, in one embodiment, foot plate assemblies 630 may be mounted in a "back-to-back" manner using a single foot mounting bolt 626. Furthermore, consistent with embodiments described herein, adjustments to the "y" direction positioning of foot plate assembly 630 relative to mounting plates 608 may be made by moving foot plate mounting bolts 626 within foot assembly mounting slot 710 prior to tightening foot plate mounting nut 627.

As shown in FIG. 8A, consistent with embodiments described herein, bottom 806 of main plate 802 may include an anchor bolt mounting slot 812 formed therein. Anchor bolt mounting slot 812 may be configured to include an "x" dimension that is larger than its "y" dimension, resulting in an elongated opening. As shown in FIG. 6A, anchor bolt mounting slot 812 is configured to receive anchor bolt assembly 634 therein. As described below, anchor bolt assembly 634 is secured to an exposed end of embedded helical pier 628. As described in additional detail below, the slot form of anchor bolt mounting slot 812 provides adjustment or movement of the positioning of anchor bolt assembly 634 within foot plate assembly 630 in a single dimension labeled as "x" (e.g., side to side) in FIG. 6A.

As shown in FIGS. 8D and 8E, pier cap assembly 632 includes a generally tubular sleeve portion 814 and a top plate 816. Sleeve portion 814 may be sized to receive an exposed end of embedded helical pier 628 and may include a plurality of pier fixing holes 818 formed therethrough. Top plate 816 encloses one end of sleeve portion 814 and includes a pair of anchor bolt receiving apertures 819 formed therethrough. As shown in FIG. 8D, top plate 816 may have a length that is sufficiently longer than an outside diameter of sleeve portion 814 to allow anchor bolt assemblies 634 to be received within anchor bolt receiving apertures 819 without interference from sleeve portion 814. In one embodiment, top plate 816 may be secured (e.g., by welding) to sleeve portion 814.

Upon assembly, the exposed end of helical pier 628 is inserted into sleeve portion 814 of pier cap assembly 632. Mounting holes are drilled (e.g., on site) through helical pier 628 through pier fixing holes 818. Pier fixing pins are inserted through pier fixing holes 818 (and corresponding mounting holes drilled into helical pier 128) and secured (e.g., via pin bolts, nuts, etc.).

Referring to FIG. 8F, each anchor bolt assembly 634 may include an anchor bolt 820, a bottom nut 821, a jam nut 822, a leveling nut 824, a top nut 826, and washers 828. In one implementation, anchor bolt 820 may include a threaded steel shaft configured to correspond to interior threads in bottom nut 821, jam nut 822, leveling nut 824, and top nut 826. A length of anchor bolt 820 may allow for adjustable installation of helical pier 628 relative to mounting plates 608 via foot plate assembly 630.

For example, in operation, bottom nuts 821 and jam nuts 822 are configured to secure anchor bolts 820 to pier cap assembly 632, while leveling nuts 824 and top nuts 826 enable vertical positioning of anchor bolt assemblies 820 (and thus, helical pier 628) relative to foot plate assemblies 630. More specifically, during installation, anchor bolts 820 are inserted through top plate 816 in pier cap assembly 632 via anchor bolt receiving apertures 819. Bottom nuts 841 are then threaded onto anchor bolts 820 below top plate 816 and jam nuts 822 are threaded onto anchor bolts 820 above top plate 816, thereby securing top plate 816. Leveling nuts 824 and washers 828 are then threaded onto anchor bolts 820.

Two foot plate assemblies 630 may then be lowered onto the anchor bolts 820. For example, anchor bolts 820 may be received within anchor bolt mounting slots 812 in main plates 402 of foot plate assemblies 630. Top nuts 826 may then be loosely threaded onto anchor bolts 820 to secure the foot plate assemblies 630 to anchor bolts 820. As briefly described above, the slotted nature of anchor bolt mounting slots 812 allows the location of anchor bolts 820 (and hence helical pier 128) to be positioned in variable locations in the "x" dimension.

Mounting plates 608 may be inserted between corresponding pairs of foot plate assemblies 630 such that mounting holes 810 in foot plate assemblies 630 align with foot plate assembly mounting slot 710 in mounting plates 608. As described above, the slotted nature of foot plate assembly mounting slot 710 allows the location of foot plate assemblies 630 to be adjusted or moved in the "y" dimension.

Once all mounting plates 608 have been positioned within their respective foot plate assemblies 630, and the entire monopole support assembly 600 has been leveled and plumbed, top nuts 826 and foot mounting nuts 627 are tightened to secure helical pier 628 to monopole support structure 600. Consistent with embodiments described herein, such an adjustable configuration allows for helical piers 628 to be precisely secured even where the exposed ends deviate from a true center by as much as three inches or more.

By providing an adjustable support mechanism for a helical pier-based monopole support system, embodiments described herein may provide an efficient and environmentally sensitive alternative to existing monopole support systems, while accommodating deviations in the locations of the embedded helical piers. More particularly, helical piers may be driven into the ground surrounding a monopole with minimal environment impact. The above-described adjustable support assemblies may be secured to both the helical piers and the monopole to provide an effective support system with minimal impact and cost.

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments.

Although the invention has been described in detail above, it is expressly understood that it will be apparent to persons skilled in the relevant art that the invention may be modified without departing from the spirit of the invention. Various changes of form, design, or arrangement may be made to the invention without departing from the spirit and scope of the invention. Therefore, the above-mentioned description is to be considered exemplary, rather than limiting, and the true scope of the invention is that defined in the following claims.

In addition, although embodiments described here and depicted in the Figures primarily relate to structures for supporting monopoles having a single member, in other embodiments consistent with aspects described herein, the described support structures may be used with other non-monopole configurations, such as H-frames, V-towers, Y-towers, Delta towers, Gull Wing towers, etc. In such embodiments, the base or bases of each type of tower or structure may be secured using helical piers in the manner described above.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A support assembly, comprising:
a plurality of support arms coupled to a pole or tower structure,
wherein the plurality of support arms project radially from the pole or tower structure in a spaced relationship;
a plurality of adjustable foot assemblies coupled to respective distal ends of the plurality of support arms,
wherein each of the plurality of adjustable foot assemblies is configured for coupling to an embedded helical pier,
wherein each of the plurality of adjustable foot assemblies is capable of movement in each of three dimensions relative to the respective support arm to which the adjustable foot assembly is coupled during installation of the support assembly,
wherein the pole or tower structure comprises:
a monopole; and a base structure configured to support the monopole,
  wherein the plurality of support arms are coupled to the base structure,
a plurality of mounting plates coupled to the base structure,
  wherein the plurality of support arms are coupled to the plurality of mounting plates,
  wherein the plurality mounting plates are configured as a plurality of doublers, with each doubler comprising two of the plurality of mounting plates,
  wherein the plurality of support arms are coupled to the plurality of doublers,
  wherein the plurality of support arms each comprise:
a pair of polygonal plates coupled together by a plurality of support gussets,
  wherein the polygonal plates each include a foot assembly mounting slot for enabling movement of the adjustable foot assembly in a first direction relative to the respective support arm during installation,
  wherein each of the plurality of adjustable foot assemblies comprise:
a foot structure having a bottom and at least one side,
  wherein the bottom of the foot structure includes an anchor bolt mounting slot for enabling movement of the helical pier in a second direction relative to the foot structure during installation,
  wherein the at least one side includes a mounting hole configured to align with the foot assembly mounting slots in the polygonal plates,
  wherein the foot structure is coupled to the respective support arm via a bolt or pin inserted into the mounting hole and the foot assembly mounting slots,
  wherein each of the plurality of adjustable foot assemblies further comprise:
    a pier cap configured to securely receive an exposed end of a respective of the helical piers; and
    an anchor bolt assembly configured to couple the pier cap to the foot structure via the anchor bolt mounting slot.

2. The support assembly of claim 1, wherein the first direction is perpendicular to the second direction.

3. The support assembly of claim 2, wherein the first direction is radially aligned with the respective support arm to which the adjustable foot assembly is coupled.

4. The support assembly of claim 1,
  wherein the pier cap comprises:
    a sleeve portion to receive the an exposed end of the respective of the helical piers;
    a top plate enclosing an end of the sleeve portion;
    and a pier cap nut coupled to the top plate and aligned with an aperture in the top plate; and
  wherein the anchor bolt assembly comprises:
    a threaded anchor bolt;
    a jam nut;
    a leveling nut; and
    a top nut,
  wherein the pier cap nut is configured to receive one end of the threaded anchor bolt,
  wherein the jam nut is configured to secure the threaded anchor bolt to the pier cap,
  wherein the foot structure is configured to receive the other end of the threaded anchor bolt via the anchor bolt mounting slot,
  wherein the leveling nut is moveable along the threaded anchor bolt in a third direction to set a distance between the foot structure and the pier cap, and
  wherein the top not is configured to secure the threaded anchor bolt to the foot structure at the set distance.

5. The support assembly of claim 4, wherein the third direction is perpendicular to both the first and second directions.

6. The support assembly of claim 1, wherein the pole or tower structure, the plurality of support arms, and the plurality of adjustable foot assemblies comprise galvanized steel.

* * * * *